United States Patent
Kang et al.

(10) Patent No.: US 10,248,125 B2
(45) Date of Patent: Apr. 2, 2019

(54) CLEANING ROBOT AND METHOD OF CONTROLLING THE SAME

(71) Applicant: Samsung Electronics Co., Ltd, Gyeonggi-do (KR)

(72) Inventors: Chin Woo Kang, Seoul (KR); Kyong Su Kim, Gyeonggi-do (KR); Jong Seok Park, Gyeonggi-do (KR); Suk Hoon Song, Seoul (KR); Kyu Ha Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 21 days.

(21) Appl. No.: 15/130,863

(22) Filed: Apr. 15, 2016

(65) Prior Publication Data

US 2016/0306358 A1    Oct. 20, 2016

(30) Foreign Application Priority Data

Apr. 16, 2015    (KR) .................. 10-2015-0053574

(51) Int. Cl.
*G05D 1/02*    (2006.01)
*G01S 17/46*    (2006.01)
(Continued)

(52) U.S. Cl.
CPC .......... *G05D 1/0214* (2013.01); *G01S 7/4813* (2013.01); *G01S 7/4815* (2013.01);
(Continued)

(58) Field of Classification Search
CPC .... G05D 1/0214; G05D 1/024; G05D 1/0248; G05D 2201/0203; G01S 7/4813;
(Continued)

(56) References Cited

U.S. PATENT DOCUMENTS

2015/0120128 A1*    4/2015    Rosenstein .......... A47L 9/2852
                                                701/28

FOREIGN PATENT DOCUMENTS

DE    10 2007 015552 B3    8/2008
EP       2 575 000 A2      4/2013
(Continued)

OTHER PUBLICATIONS

European Patent Office, "European Search Report," Application No. 16165734.1-1802, Nov. 30, 2016, 8 pages, publisher EPO, Munich, Germany.

(Continued)

*Primary Examiner* — Michael D Lang

(57) ABSTRACT

Disclosed herein are a cleaning robot in which light emitting portions emitting infrared rays are installed to face forward, sideward, and upward and infrared rays which are reflected by obstacles and return are received by one light receiving module to sense obstacles to prevent an increase in manufacturing cost caused by installing a plurality of light receiving portions and simultaneously to sense obstacles located above and a method of controlling the cleaning robot. The cleaning robot including a body and a driving portion which moves the body includes at least one light emitting portion which emits light to an obstacle, a light receiving module which obtains an image signal of the obstacle by receiving the light reflected by the obstacle, and a control portion which generates obstacle sensing information based on a position of the image signal obtained by the light receiving module and controls the driving portion based on the generated obstacle sensing information. Here, the light emitting portion is installed to emit light forward, sideward, and upward from the body and to allow the light reflected by the obstacle to be received by the light receiving module, (Continued)

thereby sensing obstacles located forward, sideward, and above from the body.

16 Claims, 30 Drawing Sheets

(51) Int. Cl.
    *G01S 17/88*     (2006.01)
    *G01S 17/89*     (2006.01)
    *G01S 7/481*     (2006.01)
    *A47L 11/40*     (2006.01)
    *G01S 17/08*     (2006.01)
    *G01S 17/48*     (2006.01)

(52) U.S. Cl.
    CPC ............ *G01S 7/4816* (2013.01); *G01S 17/46* (2013.01); *G01S 17/88* (2013.01); *G01S 17/89* (2013.01); *G05D 1/024* (2013.01); *G05D 1/0248* (2013.01); *A47L 11/4061* (2013.01); *G01S 17/08* (2013.01); *G01S 17/48* (2013.01); *G05D 2201/0203* (2013.01)

(58) Field of Classification Search
    CPC ...... G01S 7/4815; G01S 7/4816; G01S 17/46; G01S 17/88; G01S 17/89; G01S 17/08; G01S 17/48; A47L 11/4061
See application file for complete search history.

(56) References Cited

FOREIGN PATENT DOCUMENTS

| | | |
|---|---|---|
| EP | 2 631 730 A1 | 8/2013 |
| EP | 2 781 981 A2 | 9/2014 |
| EP | 2 838 410 A1 | 2/2015 |

OTHER PUBLICATIONS

Foreign Communication from Related Counterpart Application; European Patent Application No. 16165734.1; Communication pursuant to Article 94(3) EPC dated Mar. 6, 2018; 7 pages.

* cited by examiner t t+20ms

FIG.25B

| DISTANCE (mm) TO OBSTACLE | PIXEL VALUE (pixels) |
|---|---|
| 30 | 110 |
| 40 | 107 |
| 50 | 104 |
| 60 | 101 |
| 70 | 98 |
| 80 | 96 |
| 90 | 93 |
| 100 | 91 |
| 110 | 89 |
| 120 | 87 |

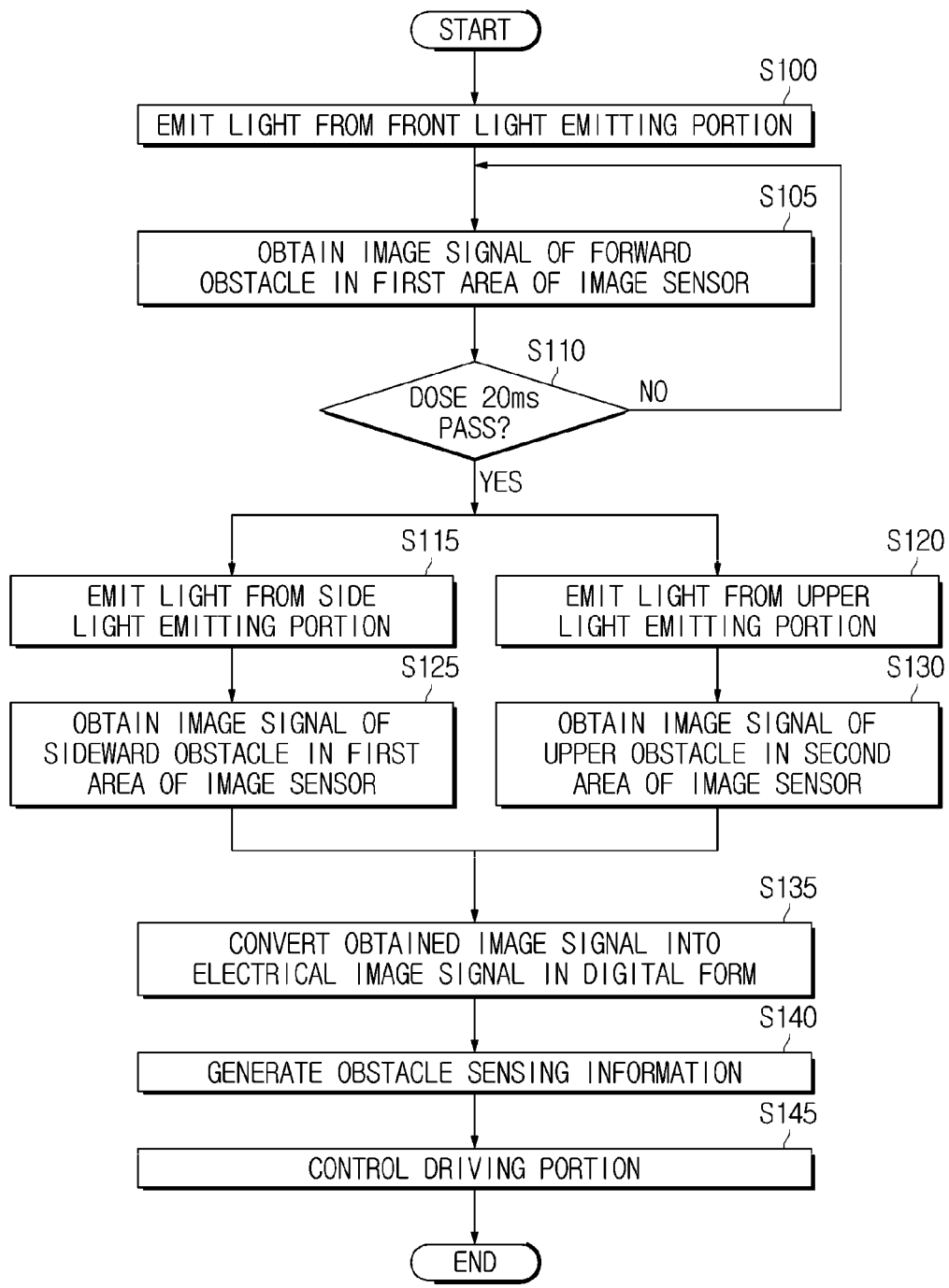

CLEANING ROBOT AND METHOD OF CONTROLLING THE SAME

CROSS-REFERENCE TO RELATED APPLICATION(S) AND CLAIM OF PRIORITY

This application claims the benefit of Korean Patent Application No. 2015-0053574, filed on Apr. 16, 2015 in the Korean Intellectual Property Office, the disclosure of which is incorporated herein by reference.

TECHNICAL FIELD

Embodiments of the present disclosure relate to a cleaning robot capable of sensing surrounding obstacles and a method of controlling the same.

BACKGROUND

Cleaning robots are apparatuses that suction dust accumulated on a surface while hovering over a space to be cleaned, thereby automatically cleaning the space without an operation by a user. That is, cleaning robots clean space to be cleaned while hovering over the space.

Generally, to sense surrounding obstacles and measure distances from obstacles, robot cleaners emit ultrasonic waves or infrared rays, sense the ultrasonic waves or infrared rays reflected by obstacles, determine the presence of obstacles or distances thereto based on time differences, phase differences, or level differences of the sensed signals or also determine the distances using reflection angles. Recently, a light emitting portion emitting ultrasonic waves or infrared rays and a light receiving portion sensing ultrasonic waves or infrared rays reflected by obstacles and returning are installed as unit modules. Here, space in which modules are located is necessary and each of the light emitting portion and the light receiving portion is necessary, thereby increasing manufacturing cost. Also, since a module capable of emitting signals only forward and sideward is installed, it is impossible to sense obstacles in a blind spot beyond a range of signal, that is, an obstacle located above.

SUMMARY

Therefore, it is an aspect of the present disclosure to provide a cleaning robot in which light emitting portions emitting infrared rays are installed to face forward, sideward, and upward and infrared rays which are reflected by obstacles and return are received by one light receiving module to sense obstacles, thereby preventing an increase in manufacturing costs caused by installing a plurality of light receiving portions and simultaneously sensing obstacles located above and a method of controlling the cleaning robot.

Additional aspects of the present disclosure will be set forth in part in the description which follows and, in part, will be obvious from the description, or may be learned by practice of the present disclosure.

In accordance with one aspect of the present disclosure, a cleaning robot including a body and a driving portion which moves the body includes at least one front light emitting portion installed to emit light forward from the cleaning robot, at least one side light emitting portion installed to emit light sideward from the cleaning robot, at least one upper light emitting portion installed to emit light upward from the cleaning robot, and one light receiving module which obtains an image signal of an obstacle by receiving the light emitted from the front light emitting portion, the side light emitting portion, and the upper light emitting portion and reflected by the obstacle. Here, an area of the light receiving module for obtaining the image signal based on the light emitted from the upper light emitting portion is different from an area of the light receiving module for obtaining the image signal based on the light emitted from the front light emitting portion and the side light emitting portion.

The cleaning robot may further include a control portion which generates obstacle sensing information based on the area of the image signal obtained by the light receiving module and controls the driving portion based on the generated obstacle sensing information.

The light receiving module may include a reflecting mirror which reflects the light reflected by the obstacle, an optical lens disposed spaced apart by a predetermined distance from the reflecting mirror to allow the light reflected by the reflecting mirror to pass through, an image sensor which obtains an image signal based on the light which passes through the optical lens, and a signal processing circuit which converts the obtained image signal into an electric image signal in a digital form.

The reflecting mirror, to allow the light emitted from the at least one front light emitting portion and the at least one side light emitting portion and reflected by the obstacle to pass through the optical lens, may reflect the reflected light.

The image sensor may obtain an image signal in a first area of the image sensor corresponding to an area of the reflecting mirror from the light emitted from the at least one front light emitting portion and the at least one side light emitting portion and reflected by the obstacle and may obtain an image signal in a second area beside the first area of the image sensor from the light emitted from the at least one upper light emitting portion and reflected by the obstacle.

The at least one front light emitting portion, the at least one side light emitting portion, and the at least one upper light emitting portion may be installed at different positions in the cleaning robot or at different heights from a ground surface.

The at least one side light emitting portion may be installed being spaced by a predetermined distance from the at least one front light emitting portion, and the at least one upper light emitting portion may be installed at a predetermined angle with a ground surface.

The at least one upper light emitting portion may at least include at least one first upper light emitting portion and at least one second upper light emitting portion installed spaced apart by a predetermined angle with the first upper light emitting portion.

The obstacle sensing information may include at least one of a distance between the body and the obstacle, a position of the obstacle, a height of the obstacle, and a shape of the obstacle.

The control portion may generate sensing information of an obstacle located at least one of forward and sideward from the body based on the image signal obtained in the first area and may generate sensing information of an obstacle located above the body based on the image signal obtained in the second area.

The control portion may control the at least one front light emitting portion and the at least one side light emitting portion to emit the light with a time difference The control portion may generate the sensing information of each of the obstacles located forward and sideward from the body based on the image signal obtained in the first area of the image sensor from the light emitted with a time difference and reflected by the obstacle.

The control portion, based on the sensing information of each of the obstacles located forward and sideward from the body, may calculate a distance between each of a front and the sides of the body and each of the obstacles.

The control portion may determine a driving type of the cleaning robot and may control the driving portion based on the calculated distances and the generated obstacle sensing information.

In accordance with another aspect of the present disclosure, a method of controlling a cleaning robot including a body and a driving portion which moves the body includes emitting, by a front light emitting portion, light forward from the cleaning robot, emitting, by a side light emitting portion, light sideward from the cleaning robot, emitting, by an upper light emitting portion, light upward from the cleaning robot, obtaining, by one light receiving module, an image signal of an obstacle by receiving the light emitted from the front light emitting portion, the side light emitting portion, and the upper light emitting portion and then reflected by the obstacle, generating obstacle sensing information based on an area of the image signal obtained by the one light receiving module, and controlling the driving portion based on the generated obstacle sensing information.

In the obtaining of the image signal of the obstacle by the one light receiving module, an area of the light receiving module for obtaining the image signal based on the light emitted from the upper light emitting portion may be different from an area of the light receiving module for obtaining the image signal based on the light emitted from the front light emitting portion and the side light emitting portion.

The light emitted forward and sideward from the body may be reflected by the obstacle and then may be reflected by a reflecting mirror and passes through an optical lens, and the light emitted upward from the body may be reflected by the obstacle and then may pass through the optical lens without being reflected by the reflecting mirror.

The obtaining, by the one light receiving module, of the image signal of the obstacle by receiving the light reflected by the obstacle may include obtaining the image signal in a first area of an image sensor, corresponding to an area of the reflecting mirror, from the light emitted forward and sideward from the body and reflected by the obstacle and obtaining the image signal in a second area beside the first area of the image sensor from the light emitted upward from the body and the reflected by the obstacle.

The emitting the light forward and sideward from the body may include emitting the light with a time difference.

The method may include generating sensing information of an obstacle located at least one of forward and sideward from the body based on the image signal obtained in the first area and generating sensing information of an obstacle located above the body based on the image signal obtained in the second area.

The method may include generating the sensing information of each of the obstacles located forward and sideward from the body based on the image signal obtained in the first area of the image sensor from the light emitted at the time interval and reflected by the obstacle.

The method may include, based on the sensing information of each of the obstacles located forward and sideward from the body, calculating distances between a front and the sides of the body and each of the obstacles.

The method may include determining a driving type of the cleaning robot based on the calculated distances and the generated obstacle sensing information and controlling the driving portion.

In accordance with still another aspect of the present disclosure, a cleaning robot including a body and a driving portion which moves the body includes at least one front light emitting portion installed to emit light forward from the cleaning robot, at least one upper light emitting portion installed to emit light upward from the cleaning robot, and one light receiving module which obtains an image signal of an obstacle by receiving the light emitted from the front light emitting portion and the upper light emitting portion and reflected by the obstacle. Herein, an area of the light receiving module for obtaining the image signal based on the light emitted from the upper light emitting portion is different from an area of the light receiving module for obtaining the image signal based on the light emitted from the front light emitting portion.

The cleaning robot may further include at least one side light emitting portion installed to emit light sideward from the cleaning robot and a control portion which controls the at least one front light emitting portion and the at least one side light emitting portion to emit light with a time difference.

BRIEF DESCRIPTION OF THE DRAWINGS

These and/or other aspects of the present disclosure will become apparent and more readily appreciated from the following description of the embodiments, taken in conjunction with the accompanying drawings of which:

FIG. 25A and FIG. 25B are a graph and a table according to an equation for calculating a distance to a side obstacle in accordance with one embodiment of the present disclosure, respectively; and FIG. 26 is a flowchart illustrating a method of controlling a cleaning robot which emits light to an obstacle and generates obstacle sensing information to control a driving portion in accordance with one embodiment of the present disclosure.

DETAILED DESCRIPTION

Figure 1:
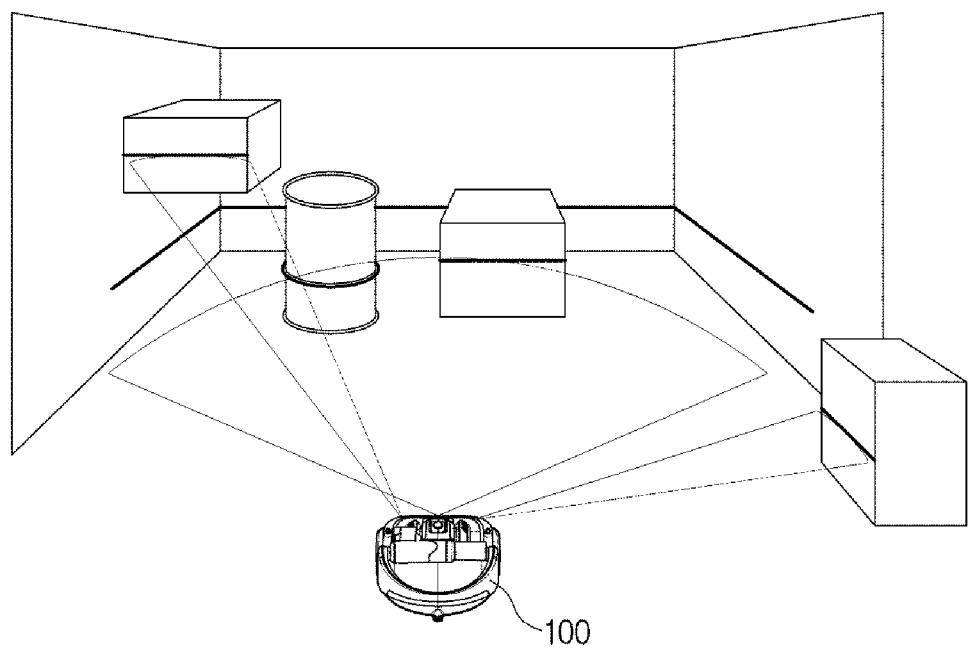
FIG. 1 is a concept view of a cleaning robot including an obstacle sensing module in accordance with one embodiment of the present disclosure.

Advantages and features of the present disclosure and a method of achieving the same will be clearly defined with reference to embodiments that will be described below in detail together with the attached drawings.

The embodiments described herein and configurations shown in the drawings are merely exemplary examples of the present disclosure. Also, various modified examples with which these embodiments and the drawings could be replaced may be present at the time of the filing of the present specification.

Also, the terms used herein explain the embodiments but do not intend to restrict and/or limit the present disclosure. Singular expressions, unless defined otherwise in contexts, include plural expressions. Throughout the specification, the terms "comprise" or "have", etc. are used herein to specify the presence of stated features, numbers, steps, operations, elements, components or combinations thereof but do not preclude the presence or addition of one or more other features, numbers, steps, operations, elements, components, or combinations thereof.

Also, it will be understood that although the terms "first", "second", etc. may be used herein to describe various components, these components should not be limited by these terms. These terms are only used to distinguish one component from another. For example, without departing from the scope of the present disclosure, a first component may be referred to as a second component, and similarly, the second component may be referred to as the first component. The term "and/or" includes any and all combinations or one of a plurality of associated listed items.

Hereinafter, a cleaning robot and a method of controlling the same in accordance with embodiments of the present disclosure will be described in detail with reference to the attached drawings. Throughout the drawings, like reference numerals refer to like elements and a repetitive description thereof will be omitted.

FIG. 1 is a concept view of a cleaning robot including an obstacle sensing module in accordance with one embodiment of the present disclosure.

As shown in FIG. 1, a cleaning robot 100 is an apparatus which autonomously moves in an area to be cleaned and absorbs foreign substances such as dust from a surface without an operation by a user, thereby automatically cleaning the area to be cleaned. The cleaning robot 100 described above senses an obstacle or a wall located in the area to be cleaned using various sensors and controls a moving path and a cleaning operation of the cleaning robot 100 using a sensing result.

Particularly, the cleaning robot 100 emits planar light while moving indoors and senses obstacles present at a position to which the planar light is emitted. The planar light means light with a small thickness, which is emitted from a light source and moves in many directions on the same plane.

As described above, the cleaning robot 100 including an obstacle sensing module 140 which senses obstacles may sense surroundings omnidirectionally or may sense a broad fan-shaped area. That is, obstacles located forward, obstacles located sideward, or obstacles located above the cleaning robot 100 may be sensed. Also, the cleaning robot 100 may determine a distance to an obstacle, a position of the obstacle, a height of the obstacle, and a shape of the obstacle based on a sensing result of the obstacle sensing module 140. Based on this, the cleaning robot 100 may determine an area to be cleaned to perform cleaning.

Figure 2:
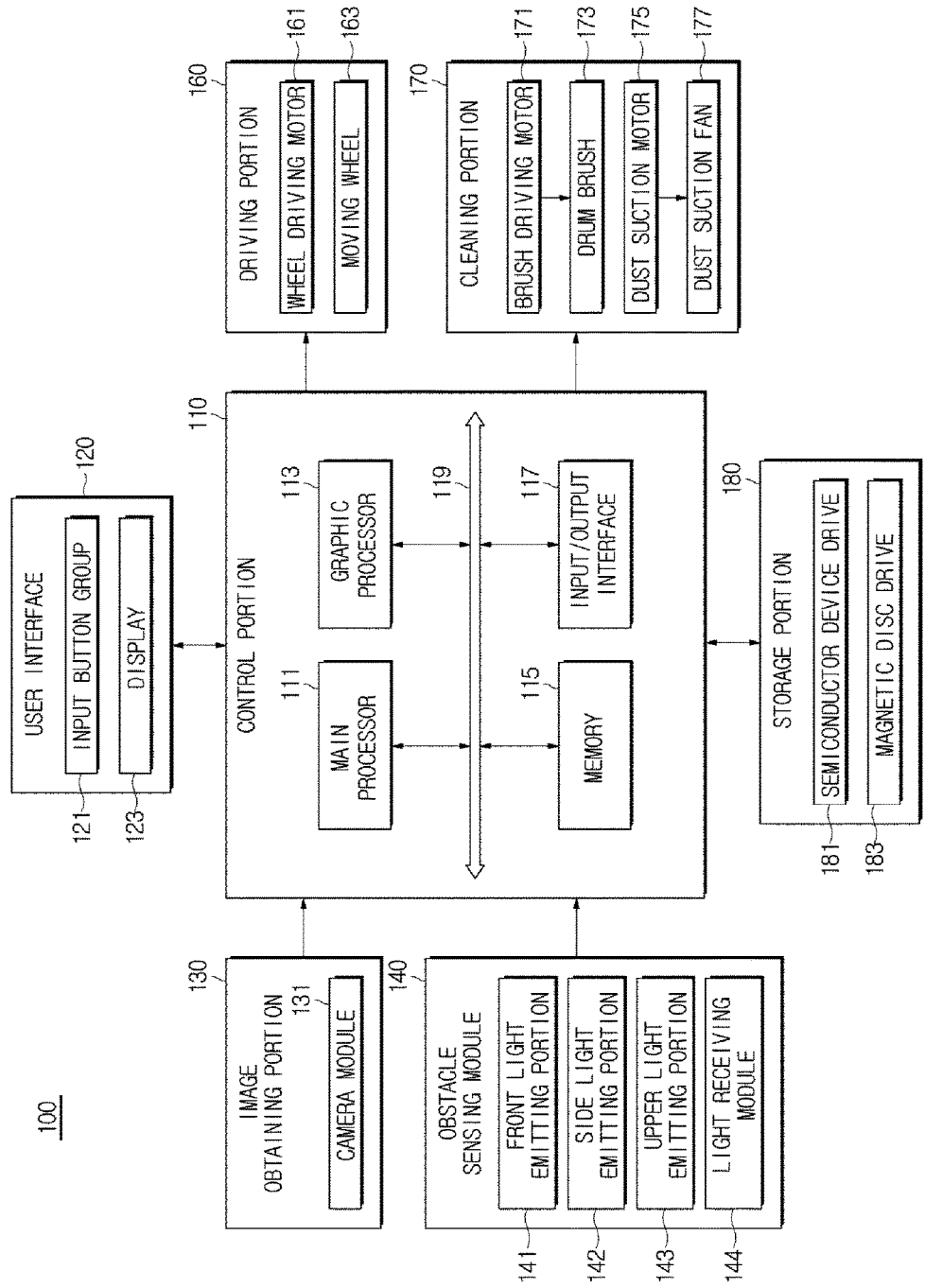
FIG. 2 illustrates a control configuration of the cleaning robot in accordance with one embodiment of the present disclosure.
Figure 3:
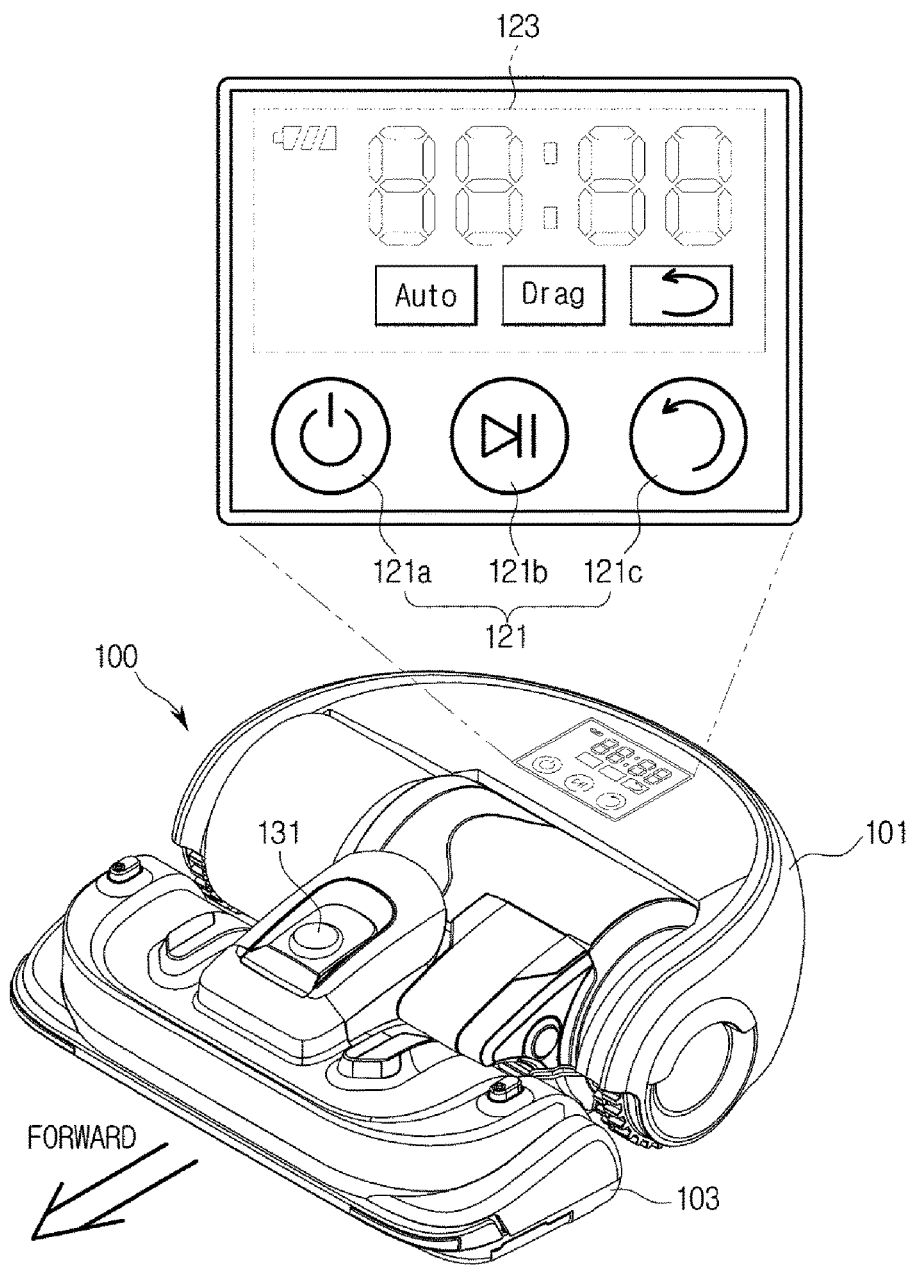
FIG. 3 illustrates an exterior of the cleaning robot in accordance with one embodiment of the present disclosure.
Figure 4:
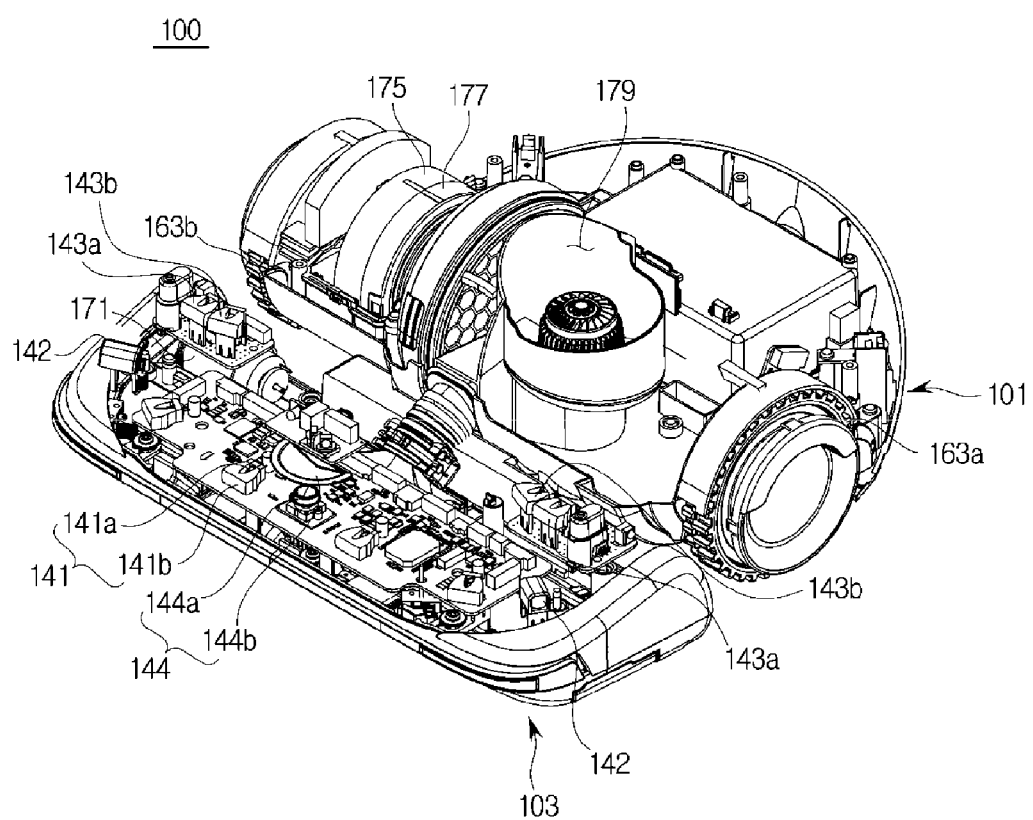
FIGS. 4 and 5 illustrate an inside of the cleaning robot in accordance with one embodiment of the present disclosure.
Figure 5:
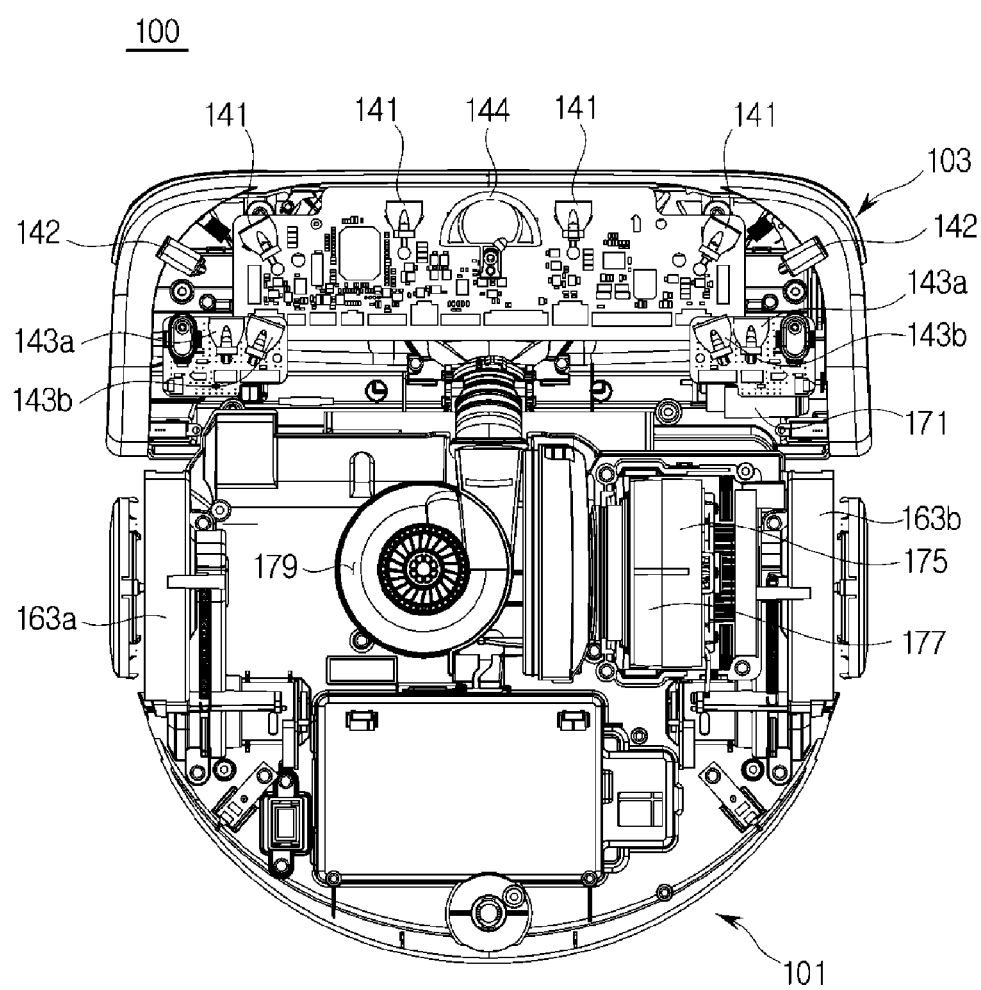
Figure 6:
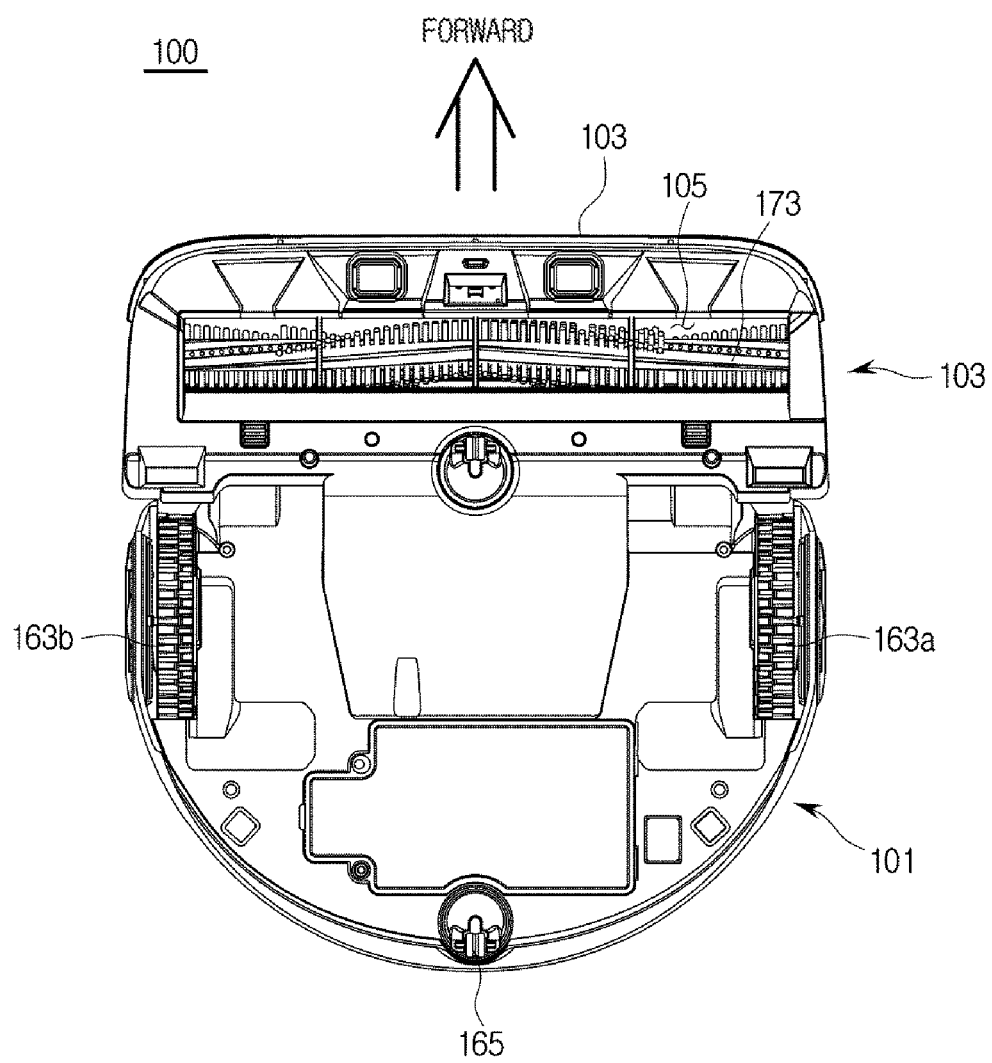
FIG. 6 is a bottom view of the cleaning robot in accordance with one embodiment of the present disclosure.

FIG. 2 illustrates a control configuration of the cleaning robot in accordance with one embodiment of the present disclosure. FIG. 3 illustrates an exterior of the cleaning robot in accordance with one embodiment of the present disclosure. FIGS. 4 and 5 illustrate an inside of the cleaning robot in accordance with one embodiment of the present disclosure. FIG. 6 is a bottom view of the cleaning robot in accordance with one embodiment of the present disclosure.

Referring to FIGS. 2 to 6, the cleaning robot 100 may include a main body 101 and a sub body 103. As shown in FIG. 3, the main body 101 may have an approximately semicircular cylinder shape, and the sub body 103 may have a rectangular parallelepiped shape. Also, components for embodying a function of the cleaning robot 100 are provided inside and outside the main body 101 and the sub body 103.

In detail, the cleaning robot 100 may include a user interface 120 which interacts with a user, an image obtaining portion 130 which obtains images around the cleaning robot 100, an obstacle sensing module 140 which sense an obstacle O, a driving portion 160 which moves the cleaning robot 100, a cleaning portion 170 which cleans a space to be cleaned, a storage portion 180 which stores programs and various data, and a control portion 110 which collectively controls an operation of the cleaning robot 100.

The user interface 120, as shown in FIG. 3, may be provided on a top surface of the main body 101 of the cleaning robot 100 and may include an input button group 121 which receives a control command from the user and a display 123 which displays operation information of the cleaning robot 100.

The input button group 121 may include a power button 121a which turns on or off the cleaning robot 100, a start/stop button 121b which starts or stops the operation of the cleaning robot 100, and a returning button 121c which returns the cleaning robot 100 to a charging station (not shown).

Also, each button included in the input button group 121 may employ a push switch which senses a pressure applied by the user, a membrane switch, or a touch switch which senses a touch of a body part of the user.

The display 123 displays information of the cleaning robot 100 corresponding to the control command input by the user. For example, the display 123 may display an operation state and a power state of the cleaning robot 100, a cleaning mode selected by the user, whether the cleaning robot 100 returns to the charging station, etc.

Also, the display 123 may employ a light emitting diode (LED) capable of emitting light by itself and an organic LED (OLED), a liquid crystal display (LCD) which includes an additional light emitting source, etc.

Although not shown in the drawings, in some embodiments, the user interface 120 may include a touch screen panel (TSP) which receives a control command input from the user and operation information corresponding to the input control command.

The TSP may include a display which displays operation information and a control command capable of being input by the user, a touch panel which detects coordinates of a point touched by a body part of a user, and a touch screen controller which determines the control command input by the user based on the touch coordinates detected by the touch panel.

The image obtaining portion 130 may include a camera module 131 which obtains images around the cleaning robot 100.

The camera module 131 may be provided on a top surface of the sub body 103 included in the cleaning robot 100 and may include a lens which condenses light emitted from above the cleaning robot 100 and an image sensor which converts the light into an electric signal.

Also, the image sensor may employ a complementary metal oxide semiconductor (CMOS) sensor or a charge coupled device (CCD) sensor.

Particularly, the camera module 131 converts images around the cleaning robot 100 into an electric signal capable of being processed by the control portion 110 and emits an electric signal corresponding to upper images. Images provided by the image obtaining portion 130 may be used to allow the control portion 110 to detect a position of the cleaning robot 100.

The obstacle sensing module 140 may sense the obstacle O which obstructs movement of the cleaning robot 100.

Here, the obstacle O means everything which protrudes from a surface of a space to be cleaned and obstructs the movement of the cleaning robot 100 and corresponds not only to furniture such as a table, sofa, etc. but also a wall surface which divides the space to be cleaned.

The obstacle sensing module 140 may include a front light emitting portion 141 which emits light forward from the cleaning robot 100, a side light emitting portion 142 which emits light sideward from the cleaning robot 100, an upper light emitting portion 143 which emits light upward from the cleaning robot 100, and a light receiving module 144 which receives light reflected by the obstacle, etc.

The cleaning robot 100 in accordance with one embodiment of the present disclosure uses light such as infrared rays, etc. to sense the obstacle O but is not limited thereto and may use ultrasonic waves or electric waves.

The front light emitting portion 141, as shown in FIGS. 4 and 5, may include a light source 141a which emits light and a wide-angle lens 141b which diffuses the emitted light in a direction parallel to a surface to be cleaned.

The light source 141a may employ an LED or a light amplification by stimulated emission of radiation (LASER) diode, which emits light in many directions.

The wide-angle lens 141b may be formed of a material which allows light to pass therethrough and may diffuse the light emitted from the light source in the direction parallel to the surface to be cleaned using refraction or total reflection. Due to the wide-angle lens 141b, the light emitted from the front light emitting portion 141 may be diffused forward in a fan shape from the cleaning robot 100. Hereinafter, light which is diffused in a direction parallel to be a surface to be cleaned and has a fan shape will be referred to as planar light.

Also, to minimize a part at which the planar light emitted from the front light emitting portion 141 does not arrive, the obstacle sensing module 140 may include a plurality of such front light emitting portions 141 as shown in FIGS. 4 and 5.

The side light emitting portion 142 may be embodied as a condensing lens as shown in the drawings. The condensing lens is a lens used to condense light in a desired direction and position and is also known as a condenser lens. A method of forming a surface light source to emit light using the wide-angle lens 141b used in the front light emitting portion 141 may lack light intensity and may decrease accuracy in depending on how the light spreads. Accordingly, the side light emitting portion 142 may be embodied as a condensing lens to form a point light source, may sense an obstacle located sideward by using a method in which the light emitted by the point light source and reflected by the obstacle is obtained by the light receiving module 144, and may calculate a distance to the obstacle.

Also, the side light emitting portion 142, like the front light emitting portion 141, may include a light source (not shown) which emits light and a wide-lens (not shown) which diffuses the emitted light in a direction parallel to a surface to be cleaned. The side light emitting portion 142 may include a left side light emitting portion 142 which slantly emits light leftward from the cleaning robot 100 and a right side light emitting portion 142 which slantly emits light rightward from the cleaning robot 100.

The side light emitting portion 142 may be used not only for detecting the obstacle O but also for movement of the cleaning robot 100. For example, in the case of an obstacle outline following movement in which the cleaning robot 100 moves while keeping a distance from the obstacle O, based on receiving the light emitted from the side light emitting portion 142 and reflected by the obstacle O by the light receiving module 144, the control portion 110 may calculate a distance between the side of the cleaning robot 100 and the obstacle O and may control the driving portion 160 to allow the cleaning robot 100 to keep a certain distance from the obstacle O based on a calculation result.

Also, not shown in FIGS. 4 and 5, to minimize a part at which the light emitted by the side light emitting portion 142 does not arrive, the obstacle sensing module 140 may include a plurality of such side light emitting portions 142.

The upper light emitting portion 143 may include a condensing lens to emit light using a point light source like the side light emitting portion 142 and may include a light source which emits light and a wide-angle lens which diffuses light to emit planar light like the front light emitting portion 141. The upper light emitting portion 143, as shown in FIGS. 4 and 5, may be located above the sub body 103. That is, the upper light emitting portion 143 may be installed at a position higher than the front light emitting portion 141 and the side light emitting portion 142 and installed at a predetermined angle with a floor surface to emit light upward from the cleaning robot 100 in a moving direction thereof. Also, the upper light emitting portion 143 may include a left first upper light emitting portion 143a which emits light upward from the cleaning robot 100 in the left and a right upper light emitting portion 143a which emits light upward from the cleaning robot 100 in the right. To minimize a blind spot of obstacles located above in the moving direction of the cleaning robot 100, as shown in FIGS. 4 and 5, a second upper light emitting portion 143b installed spaced apart by a predetermined angle from the first upper light emitting portion 143a may be included. The first upper light emitting portion 143a and the second upper light emitting portion 143b may be spaced apart by the predetermined angle in horizontal and vertical directions and may be used to sense obstacles located above using light emitted from each of them. The light emitted by the upper light emitting portion 143 may be reflected by an obstacle located above and then may be received by the light receiving module 144. Unlike the light emitted by the front light emitting portion 141 and the side light emitting portion 142, the light emitted by the upper light emitting portion 143 may not be reflected by the reflecting mirror 144a and may pass through the optical lens 144c.

Also, not shown in FIGS. 4 and 5, to minimize a part at which the light emitted by the upper light emitting portion 143 does not arrive, the obstacle sensing module 140 may include four or more such upper light emitting portions 143.

As described above, the front light emitting portion 141, the side light emitting portion 142, and the upper light emitting portion 143 of the obstacle sensing module 140 of the cleaning robot 100 in accordance with one embodiment of the present invention may only emit light and the light emitted and reflected by the obstacle may be received by the light receiving module 144. In the case of the cleaning robot 100 according to prior art, to receive light emitted from sides and a top and reflected by obstacles by a sensor module installed at the sides and top, the sensor module includes both a light emitting portion and a light receiving portion, thereby increasing manufacturing cost thereof. As described above, in accordance with one embodiment of the present disclosure, manufacturing cost of the front light emitting portion 141, the side light emitting portion 142, and the upper light emitting portion 143 may be decreased.

The light receiving module 144 may include the reflecting mirror 144a which condenses light reflected by the obstacle O and an image sensor 144b which receives the light reflected by the reflecting mirror 144a.

The reflecting mirror 144a, as shown in FIGS. 4 and 5, may be provided above the image sensor 144b and may have a conical shape with a vertex facing the image sensor 144b. The reflecting mirror 144a described above may reflect the reflected light reflected by the obstacle O to allow the reflected light to move toward the image sensor 144b.

The image sensor 144b may be provided below the reflecting mirror 144a and may receive the light reflected by the reflecting mirror 144a. In detail, the image sensor 144b may obtain a two-dimensional image signal formed at the reflecting mirror 144a by the reflected light reflected by the obstacle O. Here, the image sensor 144b may be formed of a two-dimensional image sensor in which optical sensors are arranged two-dimensionally.

As described below, when the image sensor 144b of the light receiving module 144 obtains an image signal of an obstacle by receiving light reflected by the obstacle, the image signal may be obtained in a first area A1 of the image sensor 144b corresponding to an area of the reflecting mirror 144a from the light emitted from the front light emitting portion 141 and the side light emitting portion 142 and reflected by the obstacle. On the other hand, from the light emitted from the upper light emitting portion 143 and reflected by the obstacle, the image signal may be obtained in a second area A2 of the image sensor 144b beside the first area A1. That is, as described above, since the light emitted from the front light emitting portion 141 and the side light emitting portion 142 and reflected by the obstacle is reflected by the reflecting mirror 144a and the image signal is obtained by the image sensor 144b, the image signal is obtained in the area corresponding to the reflecting mirror 144a. However, the light emitted from the upper light emitting portion 143 and reflected by the obstacle is not reflected by the reflecting mirror 144a and the image signal is obtained by the image sensor 144b, the image signal is obtained in the area not corresponding to the reflecting mirror 144a.

Here, the image sensor 144b may employ an image sensor capable of receiving light with the same wavelength as that of the light emitted by the light source 141a and light sources (not shown) of the front light emitting portion 141, the side light emitting portion 142, and the upper light emitting portion 143. For example, when the light source 141*a* of the front light emitting portion 141 emits infrared rays, the image sensor 144*b* may also employ an image sensor capable of obtaining an infrared image.

Also, the image sensor 144*b* may employ a CMOS sensor or a CCD sensor.

In some embodiments of the present disclosure, one light receiving module 144 may be provided. In other embodiments, a plurality of such light receiving modules 144 may be provided. The number and positions thereof may be varied. As described above, since the front light emitting portion 141, the side light emitting portion 142, and the upper light emitting portion 143 diffuse light emitted from a light source in various directions using a wide-angle lens or emit light using a condensing lens and the light receiving module 144 focuses light in various directions onto the image sensor 144*b* using the reflecting mirror 144*a*, the obstacle sensing module 140 may include different numbers of the front light emitting portions 141, the side light emitting portions 142, and the upper light emitting portions 143, and the light receiving module 144.

The driving portion 160 may move the cleaning robot 100 and, as shown in FIGS. 4 to 6, may include a wheel driving motor 161, a moving wheel 163, and a castor 165.

The moving wheel 163 may be provided on both ends of a bottom of the main body 101 and may include a left moving wheel 163*a* provided on the left of the cleaning robot 100 and a right moving wheel 163*b* provided on the right of the cleaning robot 100 with respect to the front of the cleaning robot 100.

Also, the moving wheel 163 receives torque from the wheel driving motor 161 and moves the cleaning robot 100.

The wheel driving motor 161 generates the torque for rotating the moving wheel 163 and includes a left driving motor which rotates the left moving wheel 163*a* and a right driving motor which rotates the right moving wheel 163*b*.

The left driving motor and the right driving motor may each receive driving control signals from the control portion 110 and may independently operate.

As described above, the left moving wheel 163*a* and the right moving wheel 163*b* may independently rotate due to the left driving motor and the right driving motor which independently operate.

Also, since the left moving wheel 163*a* and the right moving wheel 163*b* independently rotate, the cleaning robot 100 may move forward and backward, may turn, and may rotate in place.

For example, the cleaning robot 100 may linearly move forward when both the left and right moving wheels 163*a* and 163*b* rotate in a first direction and may linearly move backward when both the left and right moving wheels 163*a* and 163*b* rotate in a second direction.

Also, the cleaning robot 100 may turn left and right when both the left and right moving wheels 163*a* and 163*b* rotate in the same direction at different speeds and may rotate clockwise or counterclockwise while making no linear displacement when the left and right moving wheels 163*a* and 163*b* rotate in different directions.

The castor 165 may be installed at the bottom of the main body 101 and a rotation axis of the castor 165 may rotate according to a moving direction of the cleaning robot 100. The castor 165 with the rotation axis which rotates according to the moving direction of the cleaning robot 100 as described above does not interrupt movement of the cleaning robot 100 and allows the cleaning robot 100 to move in a stable posture.

Also, in addition, the driving portion 160 may further include a motor driving circuit (not shown) which supplies driving currents to the wheel driving motor 161 according to a control signal of the control portion 110, a power transmission module (not shown) which transmits torque of the wheel driving motor 161, and a rotation sensor (not shown) which detects rotation displacement and rotating speed of the wheel driving motor 161 or the moving wheel 163.

The cleaning portion 170 includes a drum brush 173 which scatters dust on a surface of a space to be cleaned, a brush driving motor 171 which rotates the drum brush 173, a dust suction fan 177 which suctions the scattered dust, a dust suction motor 175 which rotates the dust suction fan 177, and a dust box 179 which stores the suctioned dust.

The drum brush 173, as shown in FIG. 6, is provided at a dust inlet 105 formed at a bottom of the sub body 103 and rotates around a rotating axis provided horizontally to a surface to be cleaned and scatters dust on the surface to be cleaned into the dust inlet 105.

The brush driving motor 171 is provided adjacent to the drum brush 173 and rotates the drum brush 173 according to a cleaning control signal of the control portion 110.

Although not shown in the drawings, the cleaning portion 170 may further include a motor driving circuit (not shown) which supplies driving currents to the brush driving motor 171 according to a control signal of the control portion 110 and a power transmission module (not shown) which transmits torque of the brush driving motor 171 to the drum brush 173.

The dust suction fan 177, as shown in FIGS. 4 and 5, is provided at the main body 101 and suctions the dust scattered by the drum brush 173 into the dust box 179.

The dust suction motor 175 is provided adjacent to the dust suction fan 177 and rotates the dust suction fan 177 according to a control signal of the control portion 110.

Although not shown in the drawings, the cleaning portion 170 may further include a motor driving circuit (not shown) which supplies driving currents to the dust suction motor 175 according to a control signal of the control portion 110 and a power transmission module (not shown) which transmits torque of the dust suction motor 175 to the dust suction fan 177.

The dust box 179, as shown in FIGS. 4 and 5, is provided at the main body 101 and stores the dust suctioned by the dust suction fan 177.

Also, the cleaning portion 170 may include a dust guide pipe which guides the dust suctioned through the dust inlet 105 of the sub body 103 to the dust box 179 provided at the main body 101.

The storage portion 180 may store a control program and control data for controlling the cleaning robot 100 and map information of a space to be cleaned, obtained while the cleaning robot 100 moves. Also, information on a distance (mm) from the side light emitting portion 142 of the cleaning robot 100 to an obstacle may be stored corresponding to a pixel value in the storage portion 180.

The storage portion 180 may operate as an auxiliary memory device which assists a memory 115 included in the control portion 110 which will be described below and may be formed of a nonvolatile storage medium in which stored data is not removed even though power of the cleaning robot 100 is cut off.

The storage portion 180 as described above may include a semiconductor device drive 181 which stores data in a semiconductor device and a magnetic disc drive 183 which stores data in a magnetic disc.

The control portion 110 controls overall operation of the cleaning robot 100.

In detail, the control portion 110 may include an input/output interface 117 which mediates between all types of components included in the cleaning robot 100 and the control portion 110 with respect to input and output of data, the memory 115 which stores a program and data, a graphic processor 113 which processes images, a main processor 111 which performs an arithmetic operation according to the program and data stored in the memory 115, and a system bus 119 which is a path for transmitting and receiving data among the input/output interface 117, the memory 115, the graphic processor 113, and the main processor 111.

The input/output interface 117 receives an image from the image obtaining portion 130, an obstacle sensing result of the obstacle sensing module 140, a touch sensing result of a touch sensing portion (not shown) and transmits the same to the main processor 111, the graphic processor 113, and the memory 115 through the system bus 119.

In addition, the input/output interface 117 may transmit various control signals output by the main processor 111 to the driving portion 160 or the cleaning portion 170.

The memory 115 may call and store the control program and control data for controlling the operation of the cleaning robot 100 from the storage portion 180 or may temporarily store the image obtained by the image obtaining portion 130 or the obstacle sensing result of the obstacle sensing module 140.

The memory 115 may include a volatile memory such as a static random access memory (SRAM) and a dynamic random accessory memory (DRAM). However, the memory 115 is not limited thereto and may include a non-volatile memory such as a flash memory, an erasable programmable read only memory (EPROM), electrically erasable programmable read only memory (EEPROM), etc. in some cases.

The graphic processor 113 may convert a format of the image obtained by the image obtaining portion 130 to be stored in the memory 115 or the storage portion 180 or may change the resolution or size of the image obtained by the image obtaining portion 130.

Also, the graphic processor 113 may convert a format of a reflected light image obtained by the obstacle sensing module 140 to be processed by the main processor 111.

The main processor 111 processes the sensing results of the image obtaining portion 130, the obstacle sensing module 140, and the touch sensing portion according to the program and data stored in the memory 115 or performs the arithmetic operation for controlling the driving portion 160 and the cleaning portion 170.

For example, the main processor 111 may calculate a position of the cleaning robot 100 based on the image obtained by the image obtaining portion 130 or may calculate a direction, distance, and size of an obstacle based on the image obtained by the obstacle sensing module 140.

Also, the main processor 111 may perform an arithmetic operation for determining whether to avoid or to be in contact with the obstacle O depending on the direction, distance, and size of the obstacle O. When it is determined to avoid the obstacle O, the main processor 111 may calculate a moving path for avoiding the obstacle O. When it is determined to be in contact with the obstacle O, the main processor 111 may calculate a moving path for aligning the obstacle O with the cleaning robot 100.

Also, the main processor 111 may generate moving control data to be provided to the driving portion 160 to allow the cleaning robot 100 to move along the calculated moving path.

The control portion 110 described above may control the front light emitting portion 141 and the side light emitting portion 142 to emit light with a time difference. As described below, since in the case of both light emitted from the front light emitting portion 141 and the side light emitting portion 142 and reflected by obstacles, image signals are obtained in the first area A1 of the image sensor 144*b* corresponding to the area of the reflecting mirror 144*a*, an image signal with respect to an obstacle located forward may interfere with an image signal with respect to an obstacle located sideward. Accordingly, the control portion 110 may control the light emitted by the front light emitting portion 141 and the light emitted by the side light emitting portion 142 to be emitted with the time difference and may determine that the image signal obtained in the first area A1 of the image sensor 144*b* when the light is emitted by the front light emitting portion 141 relates to a forward obstacle and the image signal obtained in the first area A1 of the image sensor 144*b* when the light is emitted by the side light emitting portion 142 relates to a side obstacle. On the other hand, since in the case of light emitted by the upper light emitting portion 143 and reflected by an obstacle, an image signal is obtained in the second area A2 of the image sensor 144*b*, there is no room for interference. Accordingly, it is unnecessary to control the light emitted by the upper light emitting portion 143 to have a time difference with the light emitted by the front light emitting portion 141 or the side light emitting portion 142.

The control portion 110 may generate sensing information of obstacles located forward and sideward from the cleaning robot 100 based on image signals obtained in the first area A1 of the image sensor 144*b* and may generate sensing information of an obstacle located above the cleaning robot 100 based on an image signal obtained in the second area A2. Here, sensing information of an obstacle may include at least one of a distance between the cleaning robot 100 and the obstacle, a position of the obstacle, a height of the obstacle, and a shape of the obstacle and may include other pieces of sensing information of the obstacle in addition. As described above, since the front light emitting portion 141 and the side light emitting portion 142 may emit light at the time interval, the control portion 110 may generate sensing information of each of obstacles located forward and sideward from the cleaning robot 100 based on image signals obtained using the light emitted at the time interval and reflected by the obstacles.

Also, the control portion 110 may control the driving portion 160 to allow the cleaning robot 100 to move on the surface to be cleaned, may control the cleaning portion 170 to clean the surface to be cleaned while the cleaning robot 100 moves, and may detect the position and size of the obstacle O based on an obstacle sensing signal of the obstacle sensing module 140.

An operation of the cleaning robot 100, which will be described below, may be considered as an operation due to a control operation of the control portion 110.

Hereinafter, a method of sensing the obstacle O by the obstacle sensing module 140 described above will be described.

Figure 7:
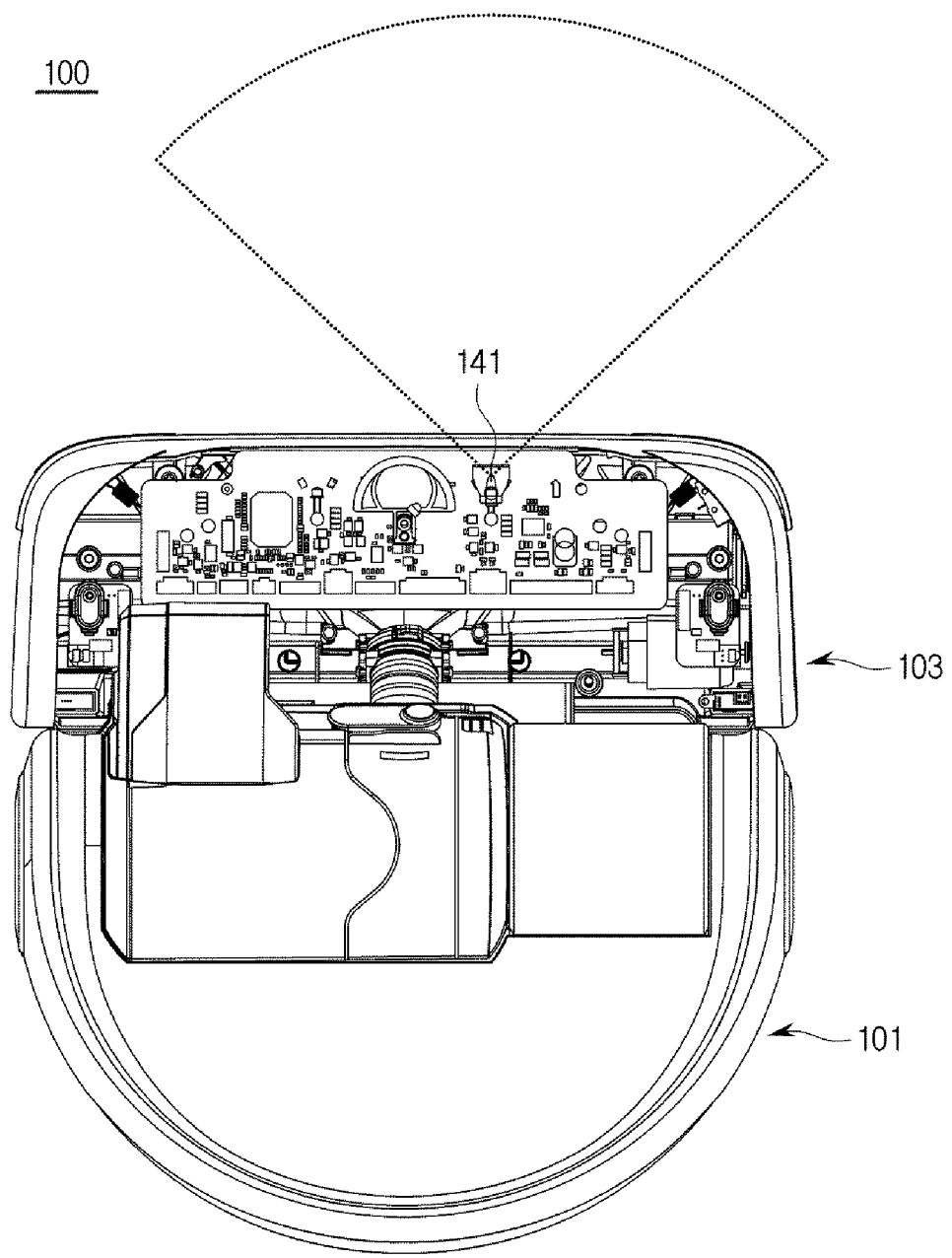
FIG. 7 illustrates an example in which the obstacle sensing module included in the cleaning robot in accordance with one embodiment of the present disclosure forms planar light.
Figure 8:
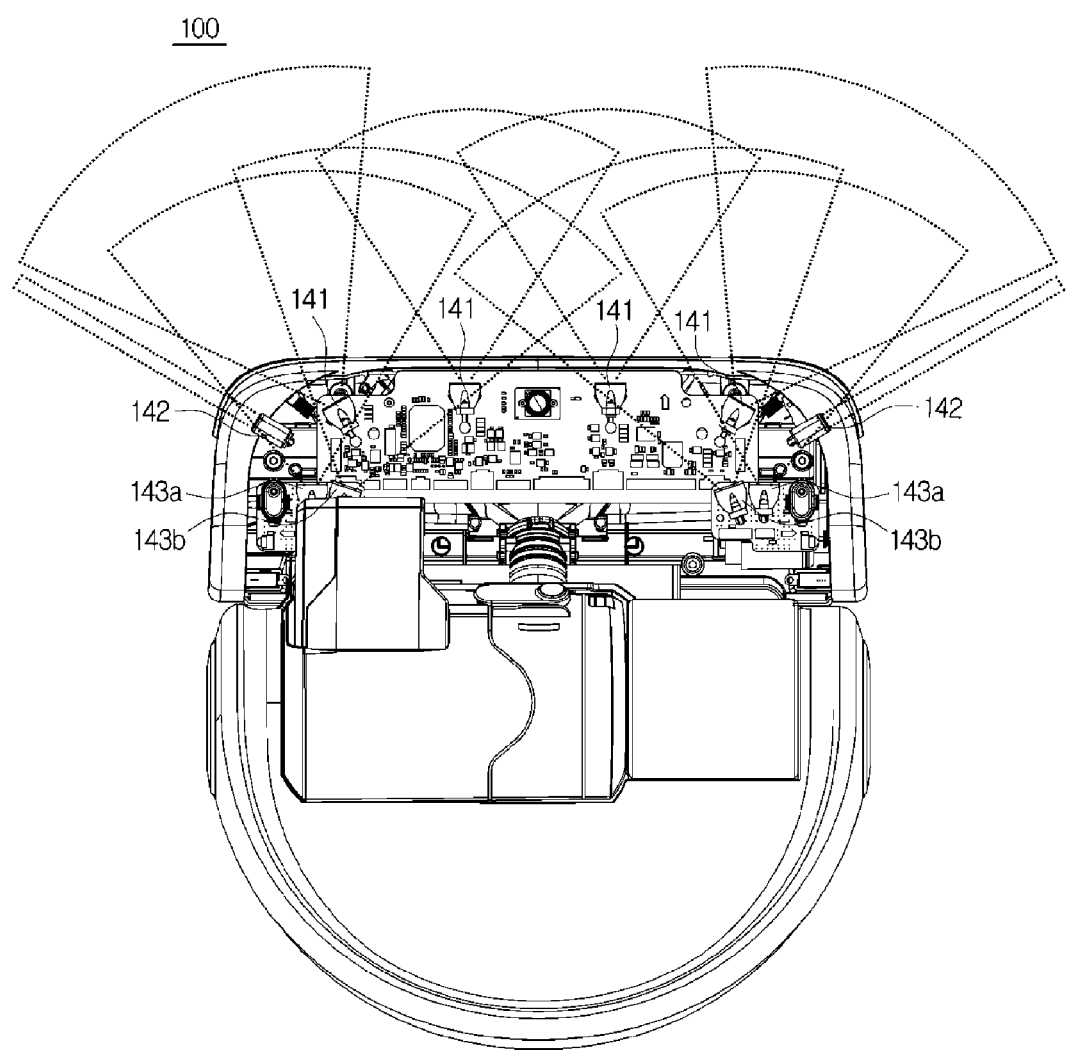
FIG. 8 illustrates an example in which the obstacle sensing module included in the cleaning robot in accordance with one embodiment of the present disclosure emits light.
Figure 9:
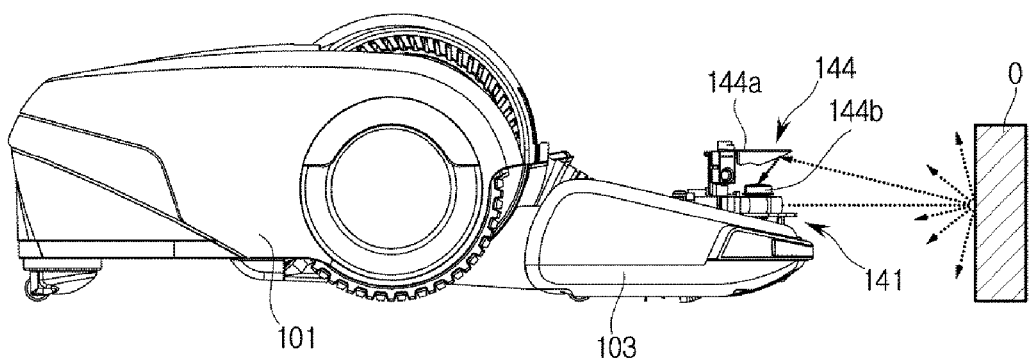
FIG. 9 illustrates an example in which the obstacle sensing module included in the cleaning robot in accordance with one embodiment of the present disclosure receives light reflected by an obstacle.

FIG. 7 illustrates an example in which the obstacle sensing module included in the cleaning robot in accordance with one embodiment of the present disclosure forms planar light. FIG. 8 illustrates an example in which the obstacle sensing module included in the cleaning robot in accordance with one embodiment of the present disclosure emits light. FIG. 9 illustrates an example in which the obstacle sensing module included in the cleaning robot in accordance with one embodiment of the present disclosure receives light reflected by an obstacle.

Referring to FIG. 7 which illustrates that the front light emitting portion 141 generates planar light from the single light source 141a, the obstacle sensing module 140 may reflect the light emitted by the light source 141a through the reflecting mirror 144a or may refract it through the optical lens 144c, thereby generating the planar light with a fan shape.

Meanwhile, referring to FIG. 8 which illustrates that planar light is formed using the plurality of front light emitting portions 141 including a plurality of light sources, the plurality of front light emitting portions 141 may be densely arranged at the front of the cleaning robot 100, and a plurality of beams of light emitted by the plurality of light sources 141a may overlap one another to form the planar light.

As described above, the obstacle sensing module 140 may include the front light emitting portion 141, the side light emitting portion 142, the upper light emitting portion 143, and the light receiving module 144.

The front light emitting portion 141 and the side light emitting portion 142 included in the obstacle sensing module 140 may emit light forward and sideward from the cleaning robot 100. The light emitted by the front light emitting portion 141 forward from the cleaning robot 100 may be diffused in a fan shape as shown in FIG. 8. The light emitted by the condensing lens of the side light emitting portion 142 sideward from the cleaning robot 100 may be emitted as a linear light from a point light source or may be emitted in a fan shape like the front light emitting portion 141 as shown in FIG. 8. Also, the light emitted by the upper light emitting portion 143 upward from the cleaning robot 100 may be emitted as a linear light from a point light source or may be diffused in a fan shape.

As shown in FIG. 8, the obstacle sensing module 140 in accordance with one embodiment of the present disclosure may include four of such front light emitting portions 141, two of such side light emitting portions 142, and four of such upper light emitting portions 143. Here, a visual field of the cleaning robot 100 in this case is shown.

Referring to FIG. 8, the four front light emitting portions 141 disposed in different positions of the front of the cleaning robot 100 are shown. When the four front light emitting portions 141 one of which can diffuse planar light at 120 degrees are used, it is possible to diffuse the planar light in an area broader than that of using one of such front light emitting portion 141 capable of diffusing planar light at 220 degrees.

Here, the plurality of front light emitting portions 141 may be installed spaced apart by predetermined distances left and right from the light receiving module 144 and may be arranged at predetermined angles. The plurality of front light emitting portions 141 may diffuse planar light forward from the cleaning robot 100 and leftward and rightward from the front of the cleaning robot 100. The areas in which the planar light is diffused may overlap one another to some degree. In addition, considering positional properties of installing the plurality of front light emitting portions 141 in the cleaning robot 100, they may be arranged in a shape for minimizing an area which cannot be sensed by the cleaning robot 100.

As shown in FIG. 8, the side light emitting portions 142 may be installed at a left side and a right side of the cleaning robot 100 and may be spaced apart at predetermined distances from the front light emitting portions 141. The side light emitting portion 142 emits light sideward from the cleaning robot 100 in the moving direction to sense an obstacle or a wall surface located sideward.

According to prior art of the present disclosure, in the cleaning robot 100, an optical sensor module installed on a side is a module which includes both a light emitting portion and a light receiving portion, emits light sideward, and directly receives the light reflected by an obstacle, thereby sensing the obstacle. Accordingly, space for installing the module which includes both the light emitting portion and the light receiving portion is needed, and manufacturing cost is increased. However, in accordance with the present disclosure, since the side light emitting portion 142 only emits light and light reflected by an obstacle is received by the light receiving module 144 same as when the front light emitting portion 141 emits light, installation space is reduced and manufacturing cost is decreased.

When the obstacle O is not located forward, sideward, and upward from the cleaning robot 100, light emitted from the front light emitting portion 141, the side light emitting portion 142, and the upper light emitting portion 143 moves forward, sideward, and upward from the cleaning robot 100 and the light receiving module 144 cannot receive the light reflected by the obstacle O.

When the obstacle O is located forward, sideward, and upward from the cleaning robot 100, light will be reflected by the obstacle. Here, the light reflected by the obstacle O, as shown in FIG. 9, is reflected in various directions which is referred to as "diffused reflection".

Some of the reflected light reflected by the obstacle O as described above, as shown in FIG. 9, may move toward the light receiving module 144 of the cleaning robot 100.

In FIGS. 7 to 9, it is illustrated that light emitted by the front light emitting portion 141 and the side light emitting portion 142 and reflected by an obstacle moves toward the light receiving module 144 and then image signals with respect to a forward obstacle and a sideward obstacle are obtained. It will be described below that light emitted by the upper light emitting portion 143 and reflected by an obstacle moves toward the light receiving module 144.

The reflected light which is emitted by the front light emitting portion 141 and the side light emitting portion 142, is reflected by the obstacle, and moves toward the light receiving module 144 is reflected by the reflecting mirror 144a to allow a moving path to face the image sensor 144b. The image sensor 144b may receive the reflected light reflected by the reflecting mirror 144a.

Here, since the reflected light is reflected by various places of the obstacle O, the image sensor 144b may obtain a reflected light image signal and the control portion 110 may calculate a distance from the obstacle O and a direction thereof based on the reflected light image signal of the obstacle sensing module 140.

In detail, depending on a distance between each of the front light emitting portion 141 and the side light emitting portion 142 and the obstacle O, an incidence angle of the light reflected from the obstacle O and incident on the reflecting mirror 144a may be changeable. Also, light incident on the reflecting mirror 144a at different incidence angles may be received at different positions of the image sensor 144b. As a result, according to the distance between each of the front light emitting portion 141 and the side light emitting portion 142 and the obstacle O, a part of the image sensor 144b for receiving the reflected light may be different. That is, according to the distance between each of the front light emitting portion 141 and the side light emitting portion 142 and the obstacle O, the reflected light image signal obtained by the image sensor 144b may be changeable.

For example, in the case of light reflected by the obstacle O located far from the cleaning robot 100 and incident onto the reflecting mirror 144a, an incidence angle thereof may be large and the reflected light image signal may be generated at a position far from the vertex of the reflecting mirror 144a. Also, in the case of light reflected by the obstacle O located close to the cleaning robot 100 and incident onto the reflecting mirror 144a, an incidence angle thereof may be small and the reflected light image signal may be generated at a position close to the vertex of the reflecting mirror 144a.

A position at which the light reflected from the obstacle O is incident on the reflecting mirror 144a is changed according to a direction of the obstacle O. Also, the reflected light reflected by different parts of the reflecting mirrors 144a may be received at different parts of the image sensor 144b. As a result, according to the direction of the obstacle O, the part of the image sensor 144b for receiving the reflected light may be changeable. That is, a reflected light image obtained by the image sensor 144b may be changeable according to the direction of the obstacle O with respect to the cleaning robot 100.

As described above, the cleaning robot 100 may calculate the direction and distance of the obstacle O according to the reflected image signal received by the image sensor 144b.

The light emitting portion 141, the side light emitting portion 142, and the light receiving module 144 which includes the reflecting mirror 144a and the image sensor 144b have been described. However, the light emitting portion 141, the side light emitting portion 142, and the light receiving module 144 are not limited thereto.

For example, the front light emitting portion 141 of the obstacle sensing module 140 may emit linear light forward from the cleaning robot 100 and a position of the obstacle O may be detected using the reflected light reflected by the obstacle O. The side light emitting portion 142 may emit linear light sideward from the cleaning robot 100 and may receive the reflected light reflected by the obstacle O located sideward from the cleaning robot 100.

Also, the obstacle sensing module 140 may transmit information related to the received reflected light and an image signal based thereon to the control portion 110 and the control portion 110 may calculate a distance between the cleaning robot 100 and the obstacle O based on the information related to the reflected light and the image signal based thereon.

For example, the obstacle sensing module 140 may transmit a level of the received reflected light to the control portion 110 and the control portion 110 may calculate the distance between the cleaning robot 100 and the obstacle O based on the level of the reflected light. In detail, the control portion 110 may determine that the distance between the cleaning robot 100 and the obstacle O is shorter as the level of the reflected light is higher, and the distance between the cleaning robot 100 and the obstacle O is longer as the level of the reflected light is lower Here, the control portion 110 may calculate the distance based on a level at a center of the reflected light. Since the light emitted by the front light emitting portion 141 and the side light emitting portion 142 and reflected by the obstacle corresponds to linear light or planar light which is a set of linear light, the light is more diffused as moving farther due to properties of light. Accordingly, the control portion 110 may determine a center of the diffused light and may calculate a distance based on the level of the center of the light.

For example, the obstacle sensing module 140 may transmit a time of fight (TOF) between emitted light and received reflected light to the control portion 110 and the control portion 110 may calculate the distance between the cleaning robot 100 and the obstacle O based on the TOF. In detail, the control portion 110 may determine that the distance between the cleaning robot 100 and the obstacle O is shorter as the TOF is smaller and the distance between the cleaning robot 100 and the obstacle O is longer as the TOF is greater.

As still another example, the obstacle sensing module 140 may transmit a distance between an emitting position at which emitted light is emitted and a receiving position at which reflected light is received to the control portion 110, and the control portion 110 may calculate the distance between the cleaning robot 100 and the obstacle O based on the distance between the emitting position and the receiving position. In detail, the control portion 110 may determine that the distance between the cleaning robot 100 and the obstacle O is shorter as the distance between the emitting position and the receiving position is shorter, and the distance between the cleaning robot 100 and the obstacle O is longer as the distance between the emitting position and the receiving position is longer.

Figure 10:
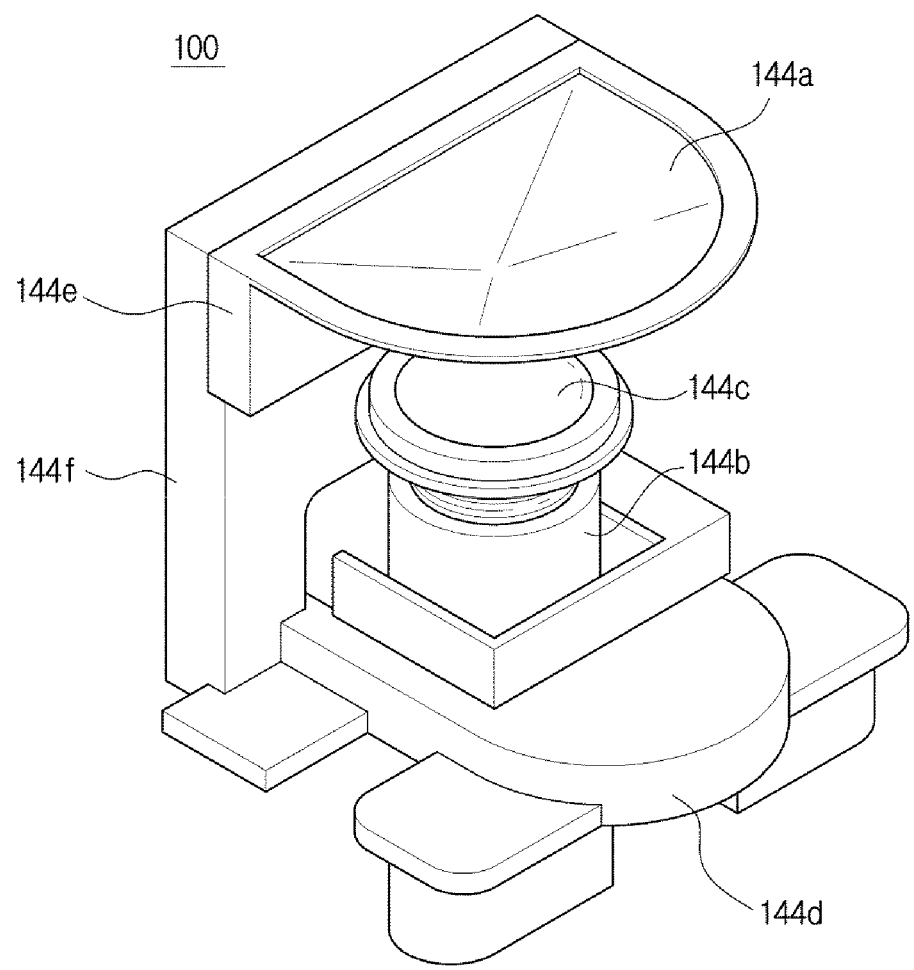
FIG. 10 illustrates an exterior of a light receiving module of the obstacle sensing module in accordance with one embodiment of the present disclosure.

FIG. 10 illustrates an external shape of the light receiving module of the obstacle sensing module in accordance with one embodiment of the present disclosure.

As shown in FIG. 10, the image sensor 144b and the optical lens 144c may be disposed above a support plate 144d and the reflecting mirror 144a, the image sensor 144b, and the optical lens 144c may be coupled with a wall board 144f using a coupling member 1443.

However, a configuration shown in FIG. 10 is merely an example of the light receiving module 144 and the light receiving module 144 is not limited thereto. Merely, when the light receiving module 144 is mounted on the cleaning robot 100, it is necessary to reduce a size thereof as much as possible.

The light receiving module 144 and the front light emitting portion 141 are not limited to being separately formed and may be integrally formed.

Figure 11A:
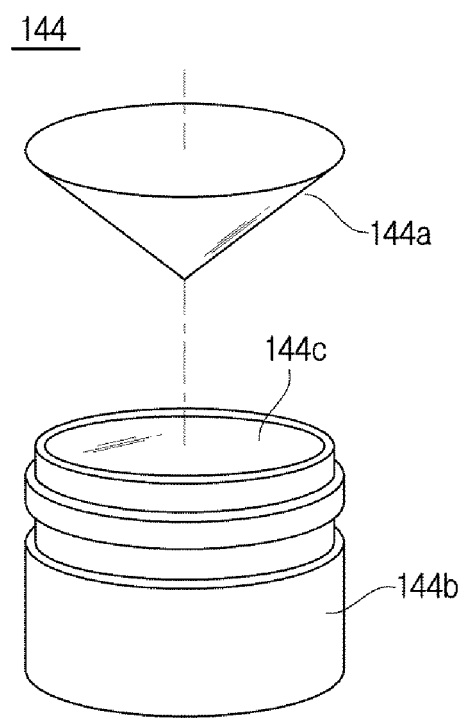
FIGS. 11A and 11B are views illustrating an example of the light receiving module included in the obstacle sensing module in accordance with one embodiment of the present disclosure and an image signal obtained by the same.
Figure 11B:
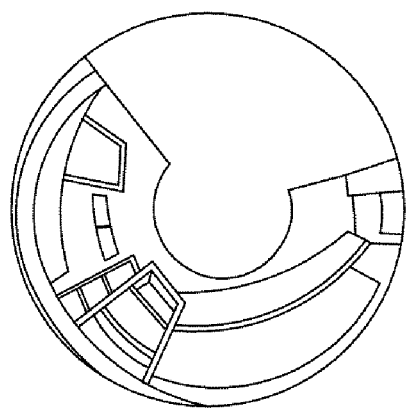

FIGS. 11A and 11B are views illustrating an example of the light receiving module included in the obstacle sensing module in accordance with one embodiment of the present disclosure and an image signal obtained by the same.

As shown in FIG. 11A, the light receiving module 144 includes the reflecting mirror 144a which changes a path of reflected light reflected by an obstacle to allow the reflected light to move toward the image sensor 144b, the optical lens 144c which condenses the reflected light in the path changed by the reflecting mirror 144a, and the image sensor 144b which receives the reflected light condensed by the optical lens 144c.

The reflecting mirror 144a may employ a conical mirror to change the path of the reflected light incident in various directions to be toward the image sensor 144b. Also, the reflecting mirror 144a may be installed above the image sensor 144b and may be disposed vertically downward to allow the vertex of the conically shaped reflecting mirror 144a to face the image sensor 144b. Also, although not shown in the drawings, the conically shaped reflecting mirror 144a may be installed below the image sensor 144b and the image sensor 144b may be disposed vertically upward to allow the vertex of the conically shaped reflecting mirror 144a to face the image sensor 144b. However, the shape of the reflecting mirror 144a is not limited to the conical shape.

Also, the reflecting mirror 144a described above may employ a metal formed of aluminum to reflect reflected light reflected by an obstacle toward the image sensor 144b without distortion or may be formed of a plastic material plated with chrome to increase reflectivity of a surface of the reflecting mirror 144a. As the reflecting mirror 144a which changes a path of light reflected by an obstacle to allow the light to move toward the image sensor 144b, the light receiving module 144 described above may employ any of a mirror, lens, a total reflecting prism, etc. capable of changing the path of the light.

A filter which allows only a wavelength of planar light to pass through may be applied on a surface of the image sensor 144b. Here, other types of light except reflected light generated from planar light emitted by a light emitting portion and reflected by an obstacle may be removed.

The image sensor 144b may receive the reflected light reflected by the obstacle and may generate an analog or digital signal. For example, as the image sensor 144b, an image sensor such as a photo diode sensor which detects an amount of reflected light, a CMOS image sensor which obtains an image using reflected light, a CCD image sensor, etc. may be employed.

Also, when the image sensor 144b is employed, the optical lens 144c disposed spaced apart at a predetermined distance from the reflecting mirror 144a to allow reflected light to pass through may be further included between the reflecting mirror 144a and the image sensor 144b. In detail, the optical lens 144c may form an image at the image sensor 144b by condensing reflected light with a path changed by the reflecting mirror 144a. The optical lens 144c may be a convex lens.

When the conically shaped reflecting mirror 144a is employed as described above, the image sensor 144b may obtain an image signal shown in FIG. 11B. In detail, the reflected light is cut off by a body of the cleaning robot 100 at a center of an image and thus an image related to an obstacle is not obtained. The image related to the obstacle is obtained from a position spaced apart by a certain distance from the center of the image in a radial direction. Also, an image of an obstacle close to the body of the cleaning robot 100 and located at a lower position from a surface to be cleaned is located at a position close to the center of the entire image and an image of an obstacle far from the body of the cleaning robot 100 and located at a higher position from the surface to be cleaned is located at a position close to a circumference of the entire image. In other words, an image of an obstacle at a position closer to the cleaning robot 100 is located at a position closer to a center of an image signal obtained by the image sensor 144b and an image of an obstacle at a position farther from the cleaning robot 100 is located at a position farther from the center of the image signal obtained by the image sensor 144b.

Hereinafter, an example of a visual field of the cleaning robot 100 formed by the reflecting mirror 144a and an obstacle image obtained by the image sensor 144b will be described.

FIGS. 12A, 12B, 12C, and 12D are views illustrating an example of the reflecting mirror included in an example of the light receiving module included in the obstacle sensing module in accordance with one embodiment of the present disclosure as well as an image signal obtained by the same.

Figure 12A:
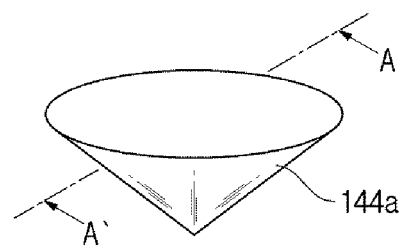
FIGS. 12A, 12B, 12C, and 12D are views illustrating an example of a reflecting mirror included in the example of the light receiving module included in the obstacle sensing module in accordance with one embodiment of the present disclosure and an image signal obtained by the same.

Referring to FIG. 12A, the reflecting mirror 144a has a general conical shape.

Figure 12B:
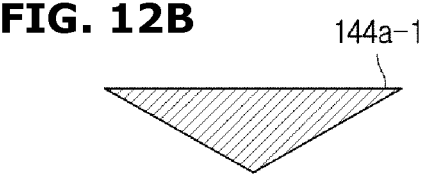

A cross section of the reflecting mirror 144a having the general conical shape taken along line A-A' is identical to a right triangle 144a-1 as shown in FIG. 12B.

Figure 12C:
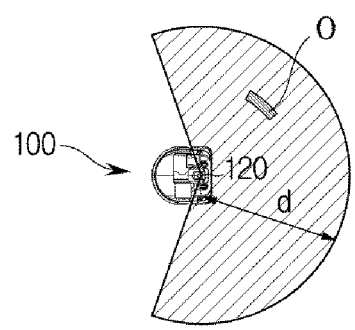

The cleaning robot 100 using the reflecting mirror 144a having the conical shape as described above has a fan-shaped visual field as shown in FIG. 12C. In detail, the cleaning robot 100 may have a viewing angle of from about 100 degrees to about 150 degrees in each direction in the left and right with respect to the front at which the light receiving module 144 including the reflecting mirror 144a is located, in other words, a viewing angle within a range from about 200 degrees to about 300 degrees with respect to the cleaning robot 100. As described above, since the plurality of front light emitting portions 141 and the plurality of side light emitting portions 142 may be installed at the obstacle sensing module 140 of the cleaning robot 100, the viewing angle is changeable. Also, the body of the cleaning robot 100 obstructs a visual field of the light receiving module 144, it is impossible to provide a viewing angle of 360 degrees. The viewing angle of the cleaning robot 100 may be changed according to the position of the light receiving module 144. For example, when the light receiving module 144 is provided protruding from the body of the cleaning robot 100, a wide viewing angle may be provided. When the light receiving module 144 is located inside the cleaning robot 100, the viewing angle becomes narrow.

Also, the cleaning robot 100 may provide a certain visual field distance d. The visual field distance d of the cleaning robot 100 described above may be changed according to resolution of the image sensor 144b, a material of the reflecting mirror 144a, and an angle of an inclined plane forming the shape of the reflecting mirror 144a, that is, a cone.

Figure 12D:
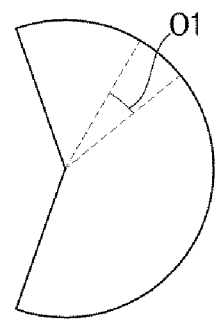

The image sensor 144b included in the cleaning robot 100 using the reflecting mirror 144a may obtain a fan-shaped image signal as shown in FIG. 12D. In detail, as shown in FIG. 12D, an image signal having a shape similar to the visual field of the cleaning robot 100 may be obtained, and an obstacle image signal brightly formed at a position corresponding to a position of an obstacle may be obtained. For example, as shown in FIG. 12C, when an obstacle is located slightly left from the front of the cleaning robot 100, the image sensor 144b may obtain an obstacle image (01) signal having a bright circular arc shape at a position slightly slanted to the left from the front of the cleaning robot 100. The cleaning robot 100 may determine whether the obstacle O is present and a position of the obstacle O based on the position of the obtained obstacle image (01) signal.

Figure 13:
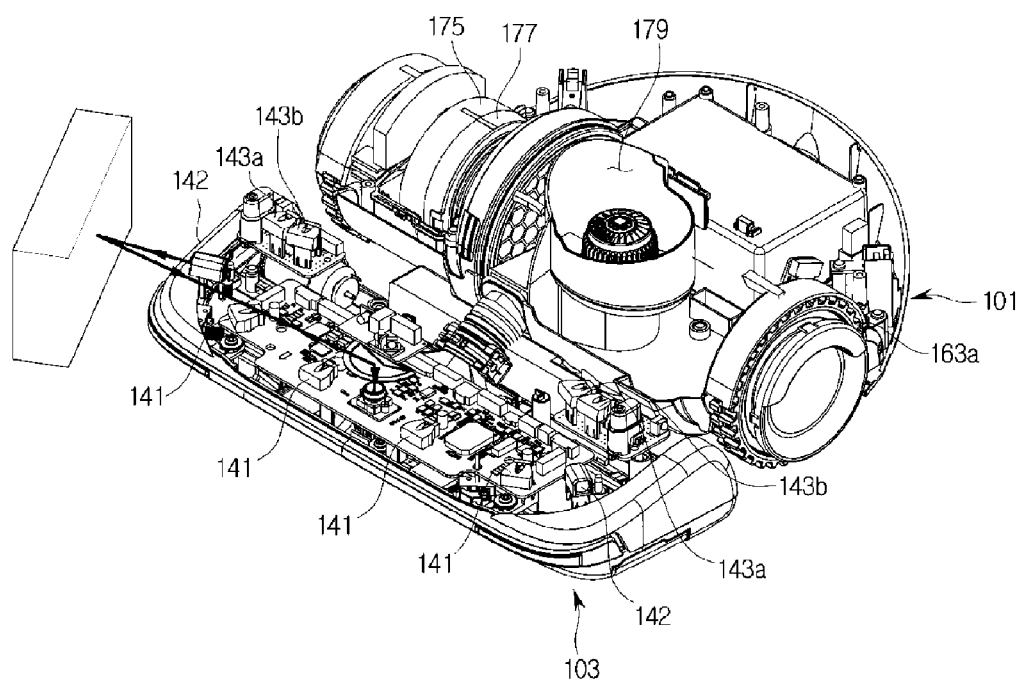
FIG. 13 is a concept view illustrating that light emitted by a side light emitting portion included in the obstacle sensing module in accordance with one embodiment of the present disclosure is reflected by a side obstacle.
Figure 14:
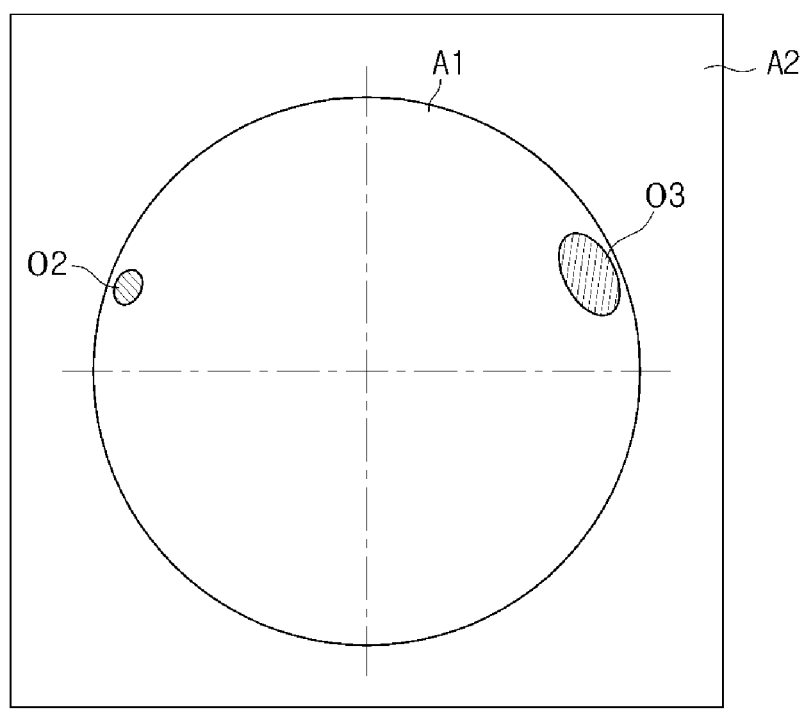
FIG. 14 is a view illustrating that the light emitted from the side light emitting portion and reflected by side obstacles is obtained by an image sensor as an image signal in accordance with one embodiment of the present disclosure.

FIG. 13 is a concept view illustrating that light emitted by the side light emitting portion included in the obstacle sensing module in accordance with one embodiment of the present disclosure is reflected by a side obstacle. FIG. 14 is a view illustrating that the light emitted from the side light emitting portion and reflected by the side obstacle is obtained by the image sensor as an image signal in accordance with one embodiment of the present disclosure.

Referring to FIG. 13, the side light emitting portion 142, as described with reference to FIGS. 4 and 5, may be installed on the sides of the sub body 103 of the body of the cleaning robot 100 and may be spaced apart by a predetermined distance from the plurality of front light emitting portion 141.

The number of the side light emitting portions 142 is not limited. Although the side light emitting portion 142 emits linear light using a condensing lens as an example as described above, the side light emitting portion 142 may include a light source and a wide-angle lens like the front light emitting portion 141. Also, the side light emitting portion 142 may be used to sense an obstacle or wall surface located sideward where a visual field of the front light emitting portion 141 does not arrive by emitting light sideward from a moving direction of the cleaning robot 100. As shown in FIG. 13, the light emitted by the side light emitting portion 142 is reflected from a wall or an obstacle located sideward, moves toward the light receiving module 144 included in the obstacle sensing module 140, is reflected by the reflecting mirror 144a, passes through the optical lens 144c, and moves toward the image sensor 144b.

Referring to FIG. 14, since the light emitted by the side light emitting portion 142 and reflected by the obstacle located sideward is reflected by the reflecting mirror 144a and incident on the image sensor 144b, the light may be displayed as an image signal in the first area A1 of the image sensor 144b, corresponding to the area of the reflecting mirror 144a. Since being an area which does not correspond to the area of the reflecting mirror 144a, the second area A2 is an area at which an image signal based on light not reflected by the reflecting mirror 144a and incident on the optical lens 144c is obtained. The image signal based on the light emitted by the side light emitting portion 142 and reflected by the obstacle may be displayed on a side in the first area A1 of the image sensor 144b. That is, as shown in FIG. 14, image signals O2 and O3 with respect to sideward obstacles positions and shapes of which are different may be obtained and displayed in the first area A1 of the image sensor 144b.

Figure 15A:
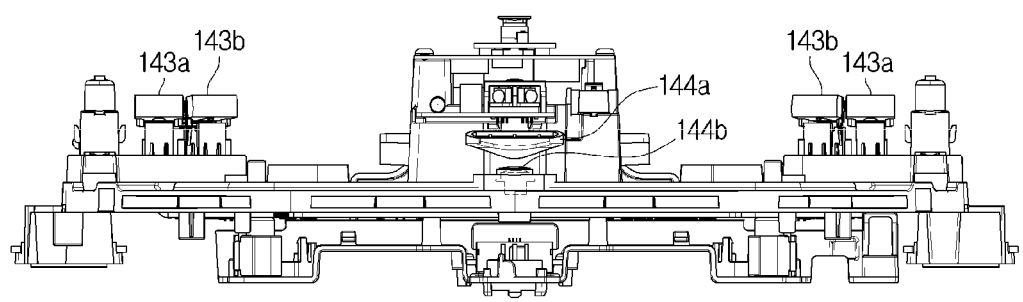
FIG. 15A is a perspective view of an upper light emitting portion included in the obstacle sensing module in accordance with one embodiment of the present disclosure when viewed from a front of the cleaning robot.
Figure 15B:
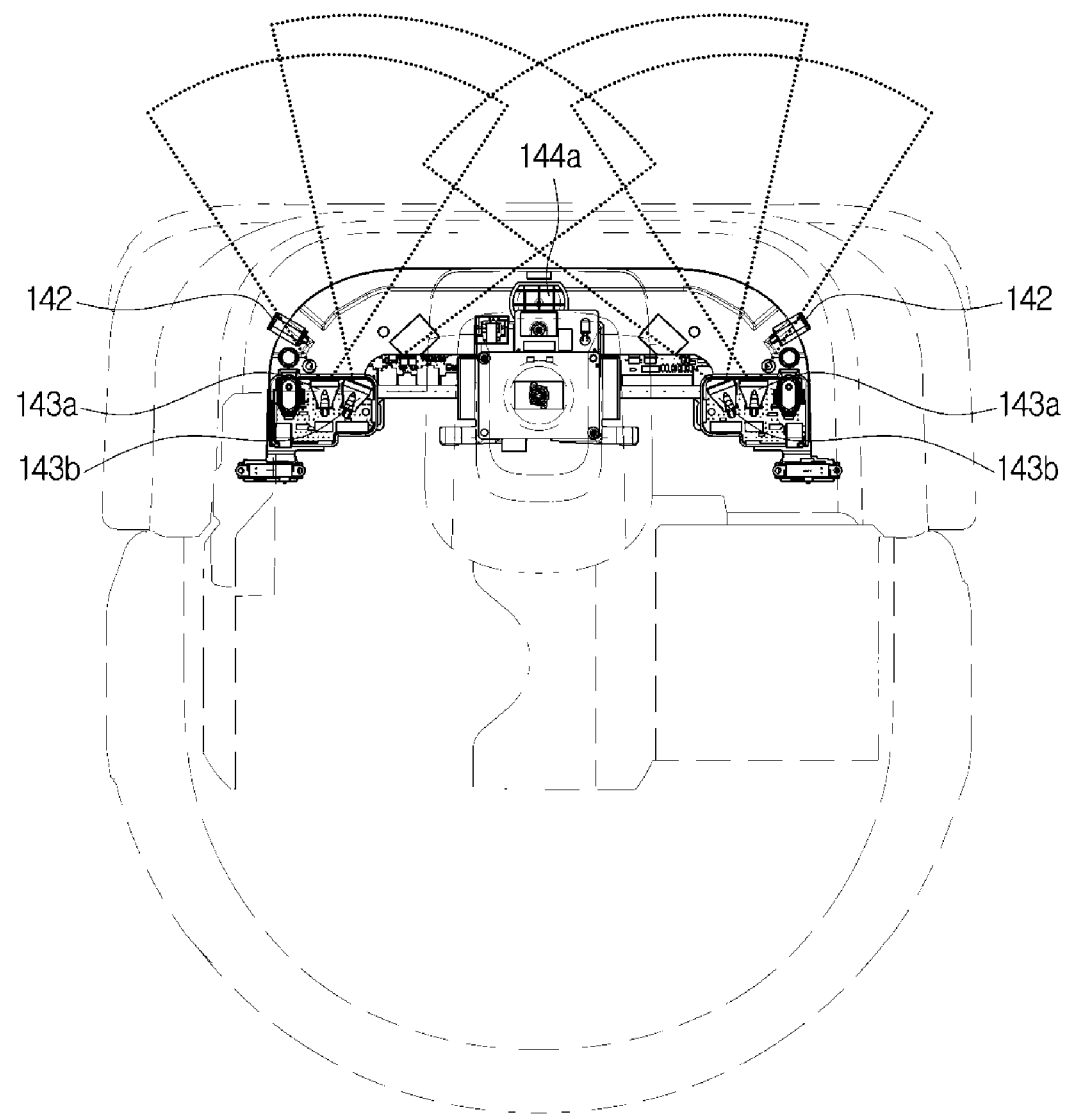
FIG. 15B is a perspective view illustrating that light is emitted by the upper light emitting portion included in the obstacle sensing module in accordance with one embodiment of the present disclosure when viewed from above the cleaning robot.

FIG. 15A is a perspective view of the upper light emitting portion included in the obstacle sensing module in accordance with one embodiment of the present disclosure when viewed from the front of the cleaning robot. FIG. 15B is a perspective view illustrating that light is emitted by the upper light emitting portion included in the obstacle sensing module in accordance with one embodiment of the present disclosure when viewed from above the cleaning robot.

As shown in FIGS. 15A and 15B, the upper light emitting portion 143 may include a condensing lens to emit light using a point light source like the side light emitting portion 142, may include a light source which emits light and a wide-angle lens which diffuses the emitted light like the front light emitting portion 141, and may be located at a top side of the sub body 103. That is, the upper light emitting portion 143 may be installed at a position higher than the front light emitting portion 141 and the side light emitting portion 142 and installed at a predetermined angle with a floor surface to emit light upward from the cleaning robot 100 in a moving direction thereof. Also, the upper light emitting portion 143 may include the left first upper light emitting portion 143a which emits light upward from the cleaning robot 100 in the left and the right upper light emitting portion 143a which emits light upward from the cleaning robot 100 in the right. To minimize a blind spot of obstacles located above in the moving direction of the cleaning robot 100, as shown in FIGS. 15A and 15B, the second upper light emitting portion 143b installed spaced by a predetermined angle from the first upper light emitting portion 143a may be included. The first upper light emitting portion 143a and the second upper light emitting portion 143b may be spaced apart by the predetermined angle in horizontal and vertical directions and may be used to sense obstacles located above using light emitted from each of them. The light emitted by the upper light emitting portion 143 may be reflected by an obstacle located above and then may be received by the light receiving module 144. Unlike the light emitted by the front light emitting portion 141 and the side light emitting portion 142, the light emitted by the upper light emitting portion 143 may not be reflected by the reflecting mirror 144a and may pass through the optical lens 144c.

Although the four upper light emitting portions 143 are shown in FIGS. 15A and 15B, the number of the upper light emitting portions 143 is not limited thereto and may be varied in other embodiments.

Figure 16:
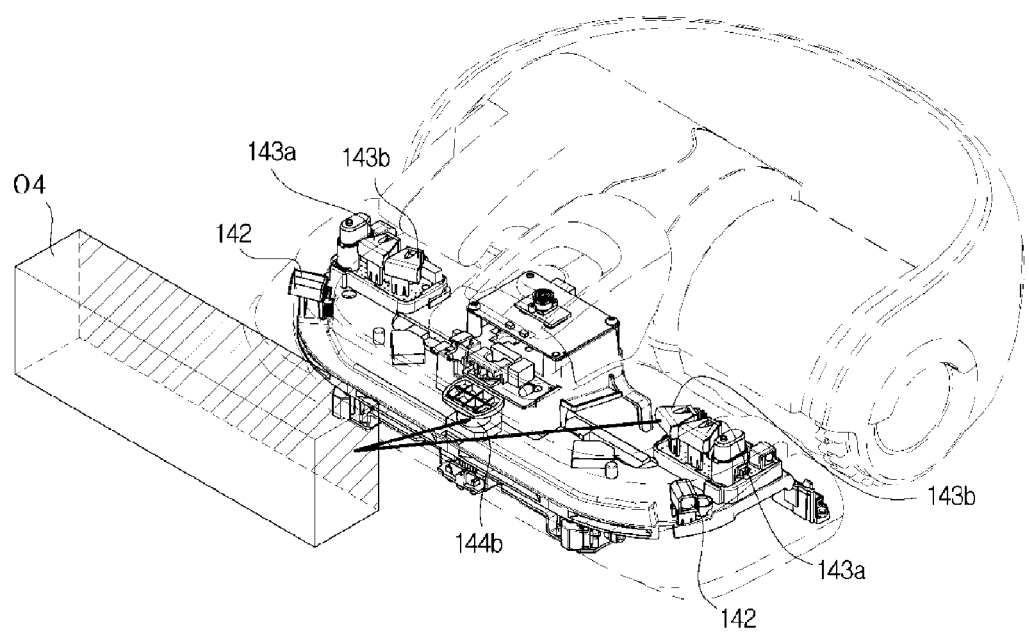
FIG. 16 is a concept view of a path in which the light emitted from the upper light emitting portion is reflected by an obstacle and then received by the light receiving module in accordance with one embodiment of the present disclosure.

FIG. 16 is a concept view of a path in which light transmitted from the upper light emitting portion is reflected by an obstacle and then received by the light receiving module in accordance with one embodiment of the present disclosure.

As shown in FIG. 16, the light emitted by the upper light emitting portion 143 may be reflected by an upper obstacle O4 located in the moving direction of the cleaning robot 100 and may be incident on the light receiving module 144. When an obstacle is located below the upper light emitting portion 143, since the obstacle is sensed by the light emitted by the front light emitting portion 141 and the side light emitting portion 142, the light emitted by the upper light emitting portion 143 may be generally used to sense the upper obstacle O4 at a position higher than the upper light emitting portion 143. The light emitted by the upper light emitting portion 143 is reflected by the upper obstacle O4, not reflected by the reflecting mirror 144a, directly passes through the optical lens 144c, and incident on the image sensor 144b. According to prior art of the present disclosure, the cleaning robot 100 may include a sensor module at an upper portion. Here, the sensor module at the upper portion includes both a light emitting portion and a light receiving portion and directly receives emitted light. Accordingly, a space for installing the sensor module which includes both the light emitting portion and the light receiving portion is needed and manufacturing cost is increased. However, in accordance with the present disclosure, as shown in FIG. 16, since the upper light emitting portion 143 only emits light and the light reflected by the obstacle O4 is received by the light receiving module 144, an installation space is reduced and manufacturing cost is decreased Unlike that shown in FIG. 16, an obstacle located above may be present at any positions above the upper light emitting portion 143 and an image signal of the upper obstacle may be obtained based on light incident on the light receiving module 144 of light totally reflected by the obstacle.

Figure 17:
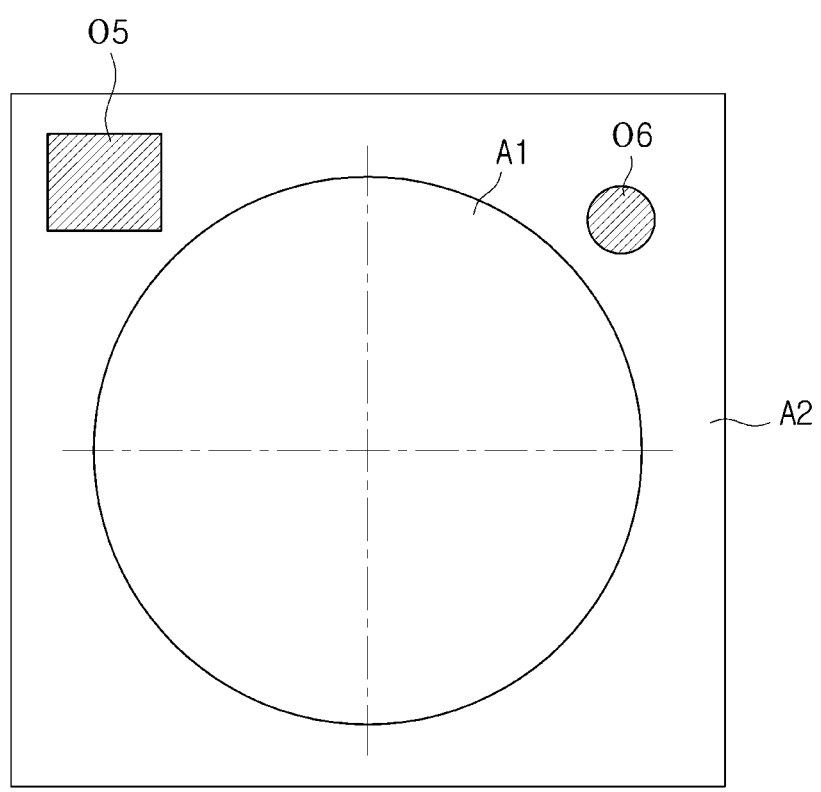
FIG. 17 is a view illustrating that the light emitted from the upper light emitting portion and reflected by upper obstacles is obtained by the image sensor as an image signal in accordance with one embodiment of the present disclosure.

FIG. 17 is a view illustrating that the light transmitted from the upper light emitting portion and reflected by upper obstacles is obtained by the image sensor as an image signal in accordance with one embodiment of the present disclosure.

Referring to FIG. 17, since the light emitted by the upper light emitting portion 143 and reflected by the obstacle located above is not reflected by the reflecting mirror 144a and incident onto the image sensor 144b, the light may be displayed as an image signal in the second area A2 of the image sensor 144b, beside the first area A1 corresponding to the area of the reflecting mirror 144a. That is, as shown in FIG. 17, an image signal of upper obstacles O5 and O6 whose positions and shapes are different may be obtained and displayed in the second area A2 of the image sensor 144b. The obstacle is higher than the cleaning robot 100 or farther therefrom as the image signal of the obstacles located above is farther from the center of the image sensor 144b, like image signals of obstacles located forward or sideward.

Figure 18:
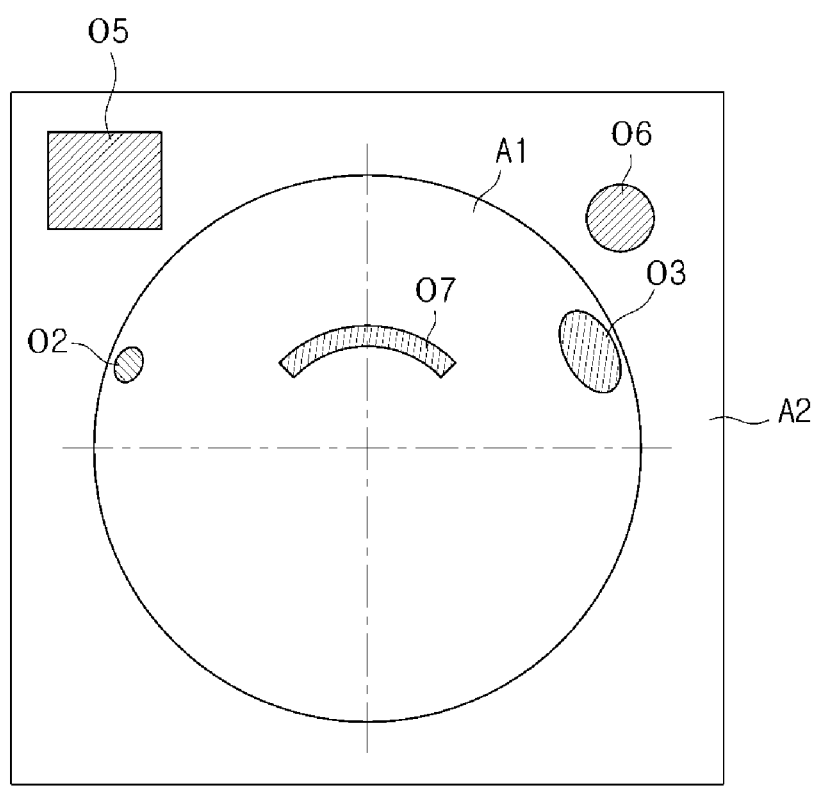
FIG. 18 is a view illustrating that the light emitted from a front light emitting portion, the side light emitting portion, and the upper light emitting portion and reflected by obstacles located forward, sideward, and above is obtained by the image sensor as an image signal in accordance with one embodiment of the present disclosure.

FIG. 18 is a view illustrating that the light emitted from the front light emitting portion, the side light emitting portion, and the upper light emitting portion and reflected by obstacles located forward, sideward, above is obtained by the image sensor as image signals in accordance with one embodiment of the present disclosure.

Referring to FIG. 18, all of the image signals of the obstacles located forward, sideward, above from the cleaning robot 100 may be displayed in the first area A1 and the second area A2 and may have various forms according to shapes and sizes of the obstacles.

As described above, the light emitted from the front light emitting portion 141 and the side light emitting portion 142 and reflected by the obstacles located forward and sideward from the cleaning robot 100 may be reflected by the reflecting mirror 144a and obtained as an image signal O7 with respect to a forward obstacle and image signals O2 and O3 with respect to sideward obstacles in the first area A1 of the image sensor 144b. Also, the light emitted by the upper light emitting portion 143 and reflected by an obstacle located above the cleaning robot 100 may not be reflected by the reflecting mirror 144a and may be obtained as image signals O5 and O6 of upper obstacles in the second area A2 of the image sensor 144b.

The image sensor 144b of the light receiving module 144 may receive the light reflected by the reflecting mirror 144a or not reflected and directly incident and may generate electrical image signals. Also, the light receiving module 144 may include a signal processing circuit (not shown) which receives the electrical image signal from the image sensor 144b and converts it into a digital signal. The signal processing circuit may convert an analog signal received from the image sensor 144b into a digital signal and may convert a format of signal. The signal processing circuit may include an analog/digital (A/D) converter (not shown) which converts an analog signal into a digital signal. For example, when the image sensor 144b is employed, the signal processing circuit may convert a format of an image obtained by the image sensor 144b according to a device. The signal processing circuit may convert the format into a certain format such as Joint Photographic Experts Group (JPEG), Motion Picture Experts Group (MPEG), etc. according to properties and needs of the device, for example, a cleaning robot.

However, when the image sensor 144b has a function of converting an electrical image signal into a digital signal, the light receiving module 144 may not include an additional signal processing circuit.

The electrical image signal obtained by the image sensor 144b may be converted into a digital image signal by the signal processing circuit and then may be transmitted to the control portion 110. The control portion 110 may determine a distance between the obstacle sensing module 140 and the obstacle, a position of the obstacle, a height of the obstacle, and a shape of the obstacle by analyzing an image converted into the digital image signal.

Figure 19:
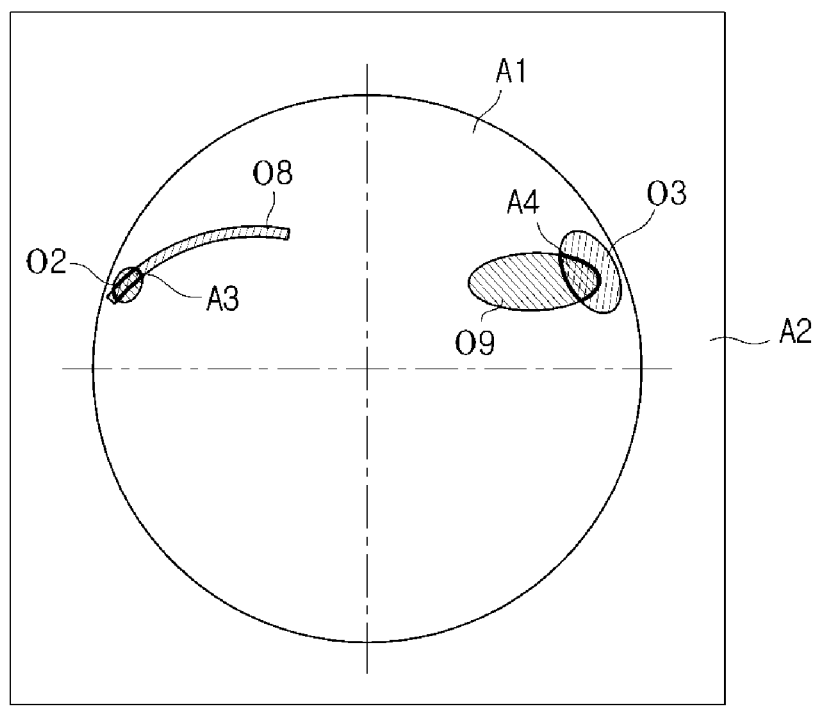
FIG. 19 is a view illustrating that an interference area occurs when light emitted from the front light emitting portion and the side light emitting portion and reflected by obstacles located forward and sideward is obtained by the image sensor as image signals in accordance with one embodiment of the present disclosure.

FIG. 19 is a view illustrating that an interference area occurs when light emitted from the front light emitting portion and the side light emitting portion and reflected by obstacles located forward and sideward is obtained by the image sensor as the image signals in accordance with one embodiment of the present disclosure.

Referring to FIG. 19, the light emitted by the front light emitting portion 141 and the side light emitting portion 142 and reflected by the obstacles located forward and sideward may be obtained as the image signals in the first area A1 of the image sensor 144b. Here, interference areas A3 and A4 at which the image signals of a forward obstacle and a sideward obstacle overlap one another may occur.

As shown in FIG. 19, image signals O8 and O9 with respect to forward obstacles and image signals O2 and O3 with respect to sideward obstacles may be displayed in the first area A1 of the image sensor 144b. Here, when the forward obstacles are inclined sideward or have large sizes to correspond to both forward and sideward areas, the interference areas A3 and A4 with respect to the image signals may occur.

The control portion 110 determines a position and distance of the obstacle based on the image signal obtained by the image sensor 144b and determines a driving type and operation of the cleaning robot 100 based thereon. When interference occurs among the image signals of the forward obstacles and sideward obstacles and it cannot be distinguished and determined whether the interference area corresponds to the image signal of the forward obstacle or the image signal of the sideward obstacle, it is impossible to select an appropriate driving type.

Accordingly, hereinafter, it will be described that the front light emitting portion 141 and the side light emitting portion 142 emit light with a time difference under control of the control portion 110, and accordingly sensing information of each of the obstacles located forward and sideward is generated.

Figure 20A:
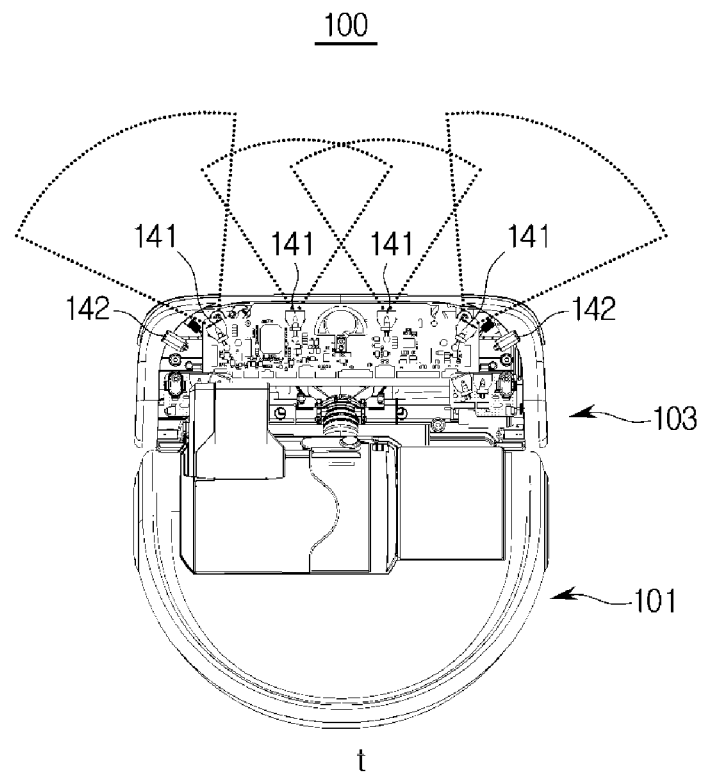
FIGS. 20A and 20B are concept views illustrating that light is emitted from the front light emitting portion and the side light emitting portion with a time difference in accordance with one embodiment of the present disclosure.
Figure 20B:
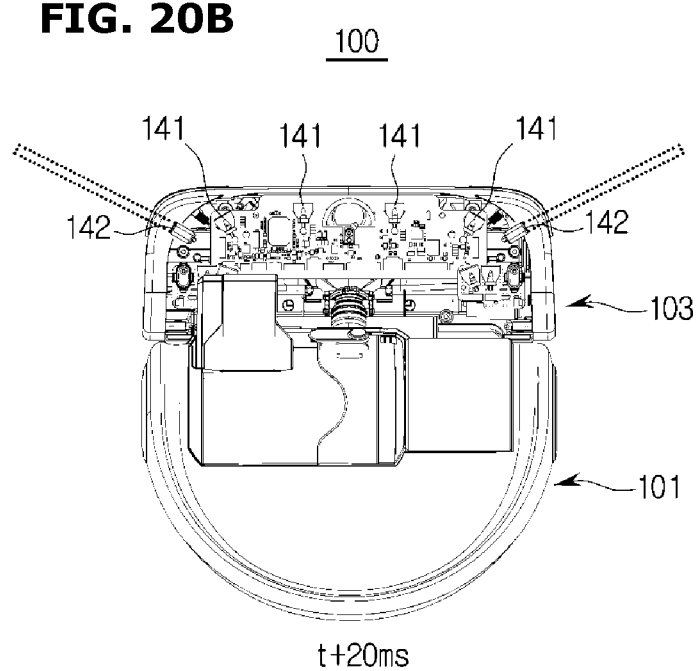
Figure 21A:
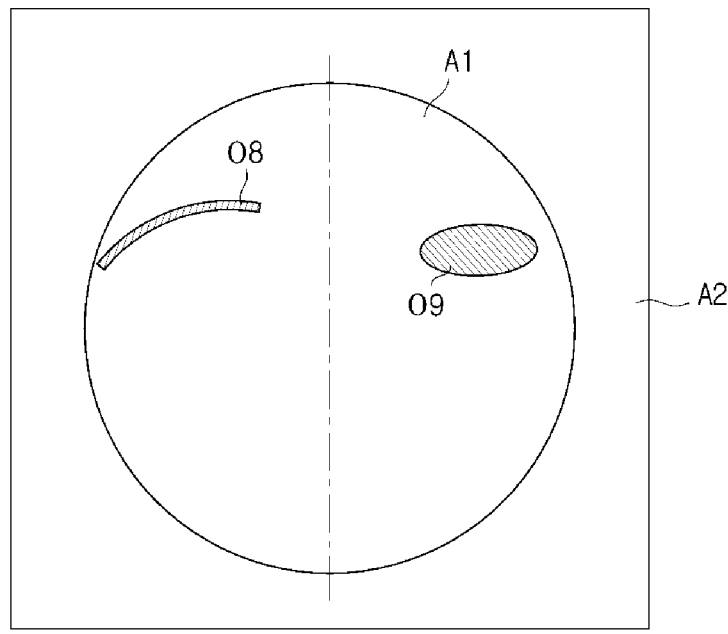
FIGS. 21A and 21B illustrates image signals obtained by the image sensor with a time difference based on the light emitted from the front light emitting portion and the side light emitting portion with a time difference in accordance with one embodiment of the present disclosure.
Figure 21B:
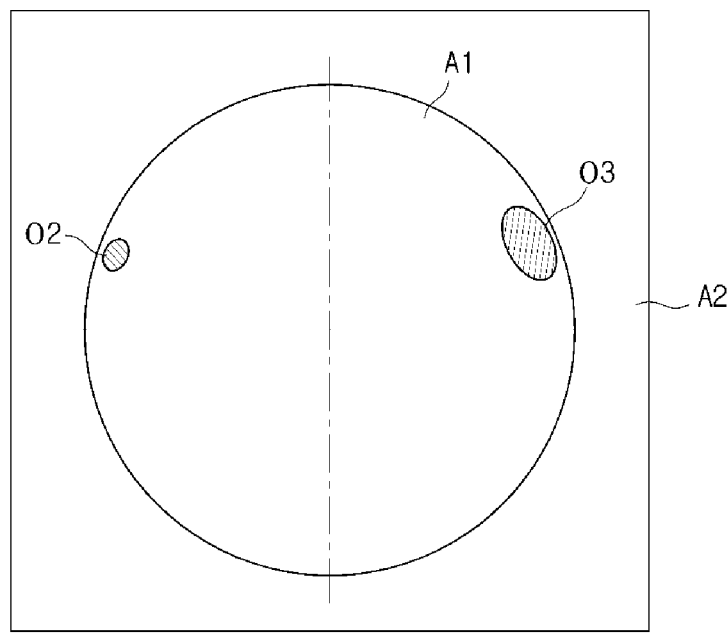

FIGS. 20A and 20B are concept views illustrating that light is emitted from the front light emitting portion and the side light emitting portion with a time difference in accordance with one embodiment of the present disclosure. FIGS. 21A and 21B illustrate image signals obtained by the image sensor with a time difference based on the light emitted from the front light emitting portion and the side light emitting portion with a time difference in accordance with one embodiment of the present disclosure.

The control portion 110 may control emitting light of the front light emitting portion 141 and the side light emitting portion 142 of the cleaning robot 100 to emit light with a predetermined time difference. That is, sensing information of an obstacle located forward from the cleaning robot 100 may be generated from an image signal obtained from light emitted from the front light emitting portion 141 and reflected by the obstacle, and sensing information of an obstacle located sideward from the cleaning robot 100 may be generated from an image signal obtained from light emitted from the side light emitting portion 142 after a predetermined time and reflected by the obstacle.

The light emitted from the front light emitting portion 141 and the light emitted from the side light emitting portion 142 may generally have a time difference of 20 ms therebetween. The time difference of 20 ms is in accordance with one embodiment of the present disclosure and another time difference may be available. Also, an order of emitting light from the front light emitting portion 141 and the side light emitting portion 142 may be different depending on embodiments.

FIG. 20A illustrates that light is emitted first from the front light emitting portion 141 at time t, FIG. 20B illustrates that light is emitted from the side light emitting portion 142 at t+20 ms time when 20 ms passes after the light is emitted from the front light emitting portion 141.

FIG. 21A illustrates that light emitted from the front light emitting portion 141 is reflected by forward obstacles and obtained by the image sensor 144b as image signals O8 and O9. FIG. 21B illustrates that light emitted from the side light emitting portion 142 after 20 ms passes is reflected by side obstacles and obtained by the image sensor 144b as image signals O2 and O3.

The control portion 110 may control the front light emitting portion 141 to emit light and may generate sensing information of obstacles located forward based on the image signals O8 and O9 obtained therefrom and may control the side light emitting portion 142 to emit light after 20 ms and may generate sensing information of obstacles located sideward based on the image signals O2 and O3 obtained therefrom.

That is, the control portion 110 may control the light to be sequentially emitted with a time difference as described above, thereby preventing image signals obtained by the image sensor 144b from overlapping one another, determining a driving type of the cleaning robot 100 and controlling the driving portion 160 based on the sensing information of each of the forward obstacles and sideward obstacles.

Since image signals obtained based on the light emitted from the upper light emitting portion 143 and reflected by obstacles located above are obtained in the second area A2 of the image sensor 144b as described above, unlike the image signals of the forward obstacles and sideward obstacles, overlapping of the image signals does not occur. Accordingly, since it is unnecessary for the upper light emitting portion 143 to have a time difference in emitting light from the front light emitting portion 141 and the side light emitting portion 142, the upper light emitting portion 143 may emit light at the same time as that of the front light emitting portion 141 or may emit light at the same time as that of the side light emitting portion 142.

Figure 22:
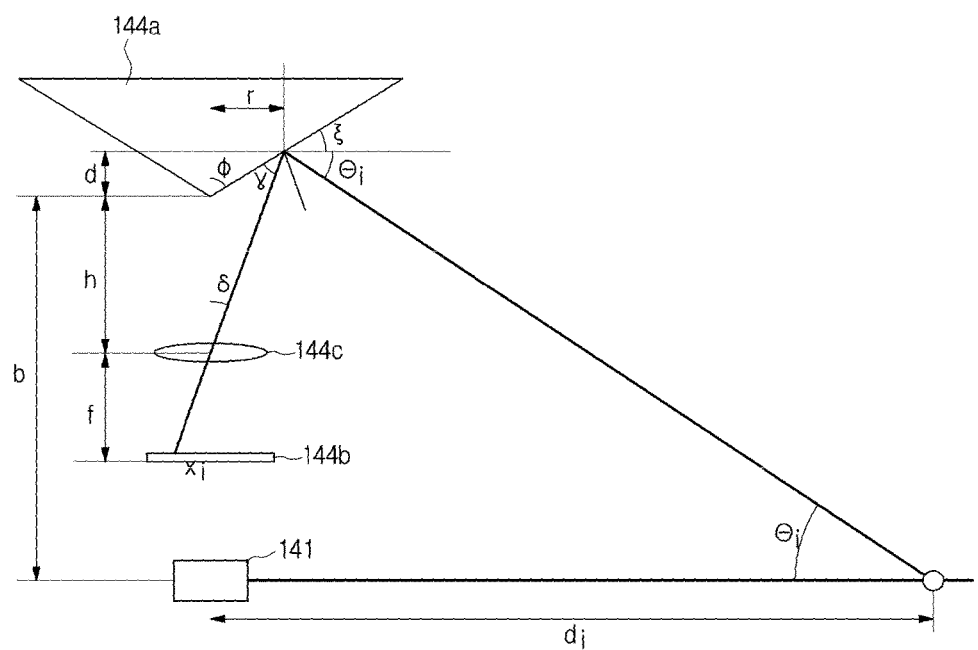
FIG. 22 is a view illustrating a relationship among each component of the obstacle sensing module in accordance with one embodiment of the present disclosure and an obstacle to calculate a distance to the obstacle.

FIG. 22 is a view illustrating a relationship between each component of the obstacle sensing module in accordance with one embodiment of the present disclosure and an obstacle to calculate a distance to the obstacle.

The control portion 110 may calculate a distance between the cleaning robot 100 and an obstacle based on an image signal of the obstacle obtained by the image sensor 144b. The calculation of the distance from the obstacle may be performed by calculating a distance between each of a forward obstacle and a side obstacle and the cleaning robot 100 and only determining the presence of an upper obstacle but may include calculating of a distance from the upper obstacle. Since all of the light emitted from the front light emitting portion 141 and the side light emitting portion 142 and reflected by obstacles is reflected by reflecting mirror 144a and incident onto the image sensor 144b, hereinafter, for convenience of description, calculating distances from the obstacles will be described based on that light emitting by one front light emitting portion 141 included in the cleaning robot 100 is reflected by an obstacle.

First, an angle $\theta_i$ formed by incident light and reflected light when planar light emitted from the front light emitting portion 141 is reflected by an obstacle and returns is obtained using following Equation 1 as follows.

$$\theta_i = \gamma - \xi \qquad \text{Equation (1)}$$
$$\xi = \frac{\pi}{2} - \phi$$
$$\gamma = \phi - \delta$$
$$\delta = \tan^{-1}\left(\frac{x_i}{f}\right)$$
$$\therefore \theta_i = 2\phi - \frac{\pi}{2} - \tan^{-1}\left(\frac{x_i}{f}\right)$$

Also, a distance between the obstacle sensing module 140 and the obstacle may be obtained using $\theta_i$ and following Equation 2.

$$d_i = r + \frac{(b+d)}{\tan\theta_i}, \qquad \text{Equation (2)}$$

if $r, d \ll b$, $$d_i \cong \frac{b}{\tan\theta_i}$$

Let $\psi = 2\phi - \frac{\pi}{2}$, $\theta_i = \psi - \delta$, $$\tan\theta_i = \frac{\tan\psi - \tan\delta}{1 + \tan\psi\tan\delta}$$
$$= \frac{\tan\psi - \frac{x_i}{f}}{1 + \tan\psi\frac{x_i}{f}}$$

$$\therefore d_i = b\frac{f + \kappa x_i}{f\kappa - x_i}, \kappa = \tan\left(2\phi - \frac{\pi}{2}\right)$$

Figure 23A:
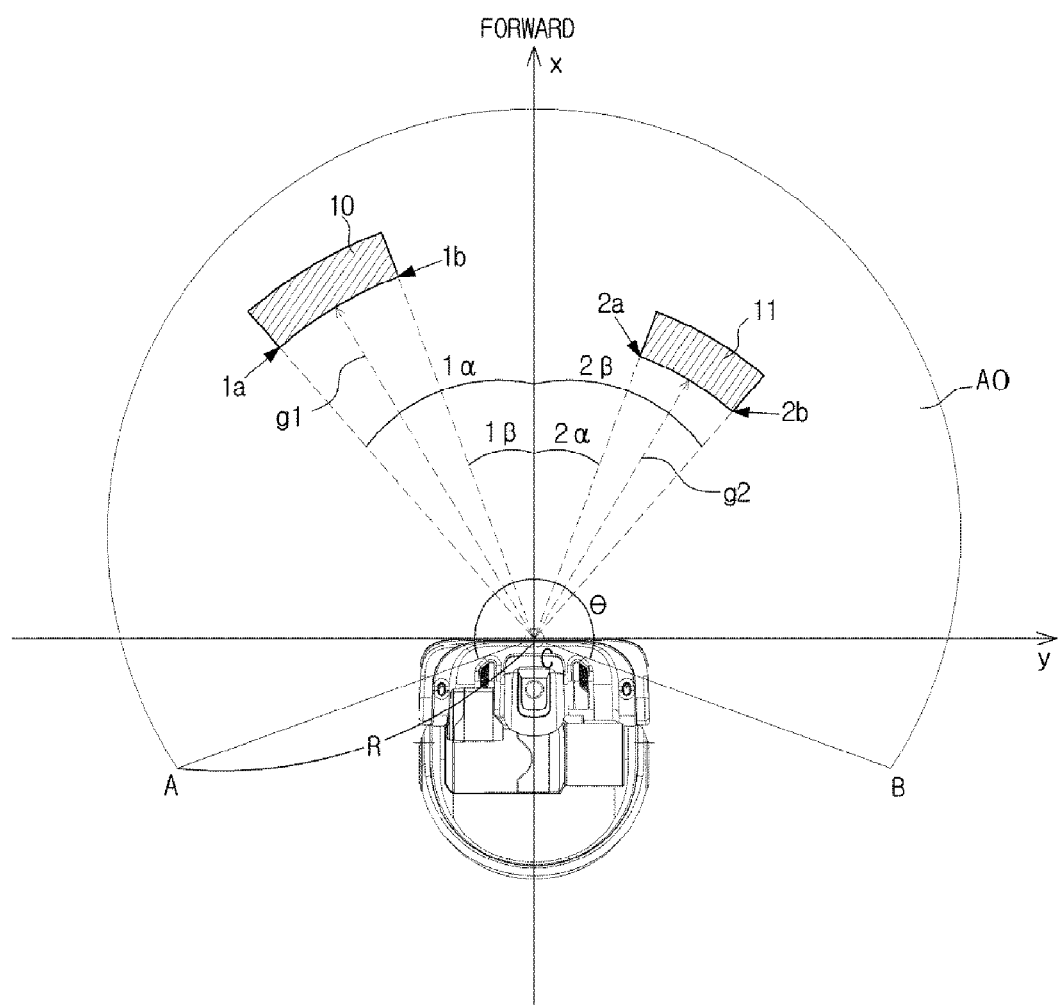
FIG. 23A is a top view illustrating the obstacle sensing module in accordance with one embodiment of the present disclosure and obstacles.

FIG. 23A is a top view illustrating the obstacle sensing module in accordance with one embodiment of the present disclosure and obstacles. FIG. 23A is a side view illustrating the obstacle sensing module in accordance with one embodiment of the present disclosure and obstacles. FIG. 23C is a view illustrating an image signal obtained by the image sensor of the obstacle sensing module in accordance with one embodiment of the present disclosure.

Hereinafter, it will be described as an example that light is emitted from one front light emitting portion 141 and the light emitted from the one front light emitting portion 141 may arrive at a plurality of obstacles 10 and 11. Light which is emitted from the plurality of front light emitting portions 141 and the plurality of side light emitting portions and arrives at obstacles may correspond to the same principle.

Referring to FIG. 23A, an x-axis in a direction parallel to a ground surface and forward from the obstacle sensing module 140 and a y-axis parallel to the ground surface and vertical to the x-axis exist. Also, in a plane formed by the x-axis and the y-axis, an area A0 capable of being sensed by the obstacle sensing module 140 is present.

The area A0 capable of being sensed by the obstacle sensing module 140 indicates an area formed of an arc determined by two radii CA and CB drawn in a circle which has a center C and a radius R and two points A and B and similar to a figure which has $\theta$ of a central angle ACB toward the arc AB. Here, the radius R may be an infinitely far distance.

Here, depending on using what wide-angle lens 141b, a value of $\theta$ may be greater or smaller but is not limited thereto and may be varied.

Also, a first obstacle 10 and a second obstacle 11 located at different distances and angles from the center C may be present in the area A0 described above. Obstacles present in the area A0 described above are not limited to the first obstacle 10 and the second obstacle 11 but may be one or more. Here, it will be described as a premise that the first obstacle 10 and the second obstacle 11 are present.

The first obstacle 10 is within a range of angle from 1β to 1α counterclockwise from the x-axis and is located at a distance of g1 from the center C. The second obstacle 11 is within a range of angle from 2β to 2α clockwise from the x-axis and is located at a distance of g2 from the center C.

Here, 1α means an angle between the x-axis and an end point 1a of the first obstacle 10 separated farthest from the x-axis, and 1β means an angle between the x-axis and an end point 1b of the first obstacle 10 closest to the x-axis.

Also, 2α means an angle between the x-axis and an end point 2a of the second obstacle 11 closest to the x-axis, and 2β means an angle between the x-axis and an end point 2b of the second obstacle 11 separate farthest from the x-axis.

Figure 23B:
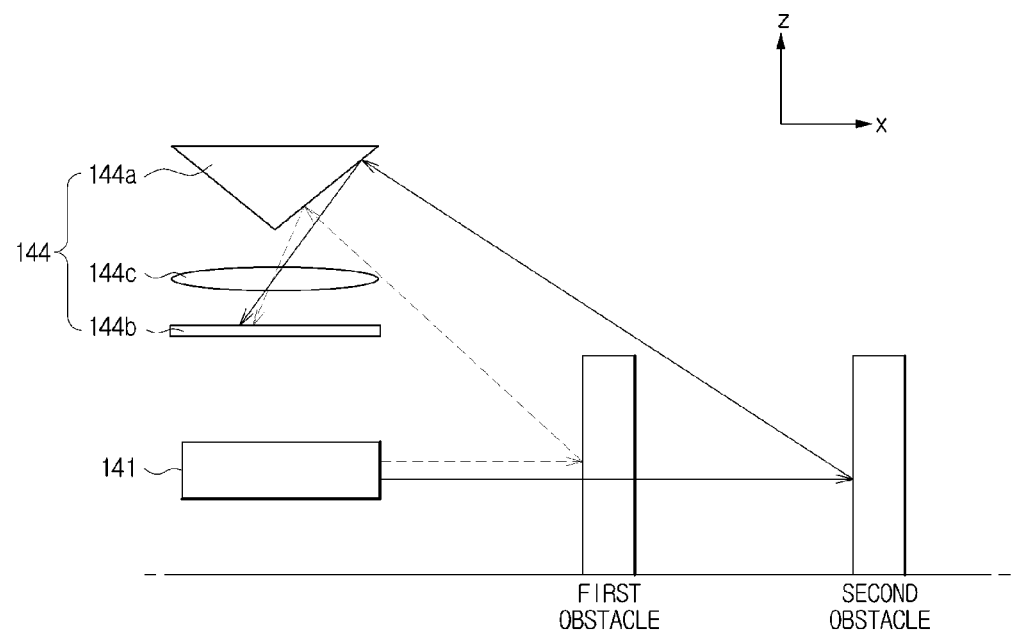
FIG. 23B is a side view illustrating the obstacle sensing module in accordance with one embodiment of the present disclosure and obstacles.
Figure 23C:
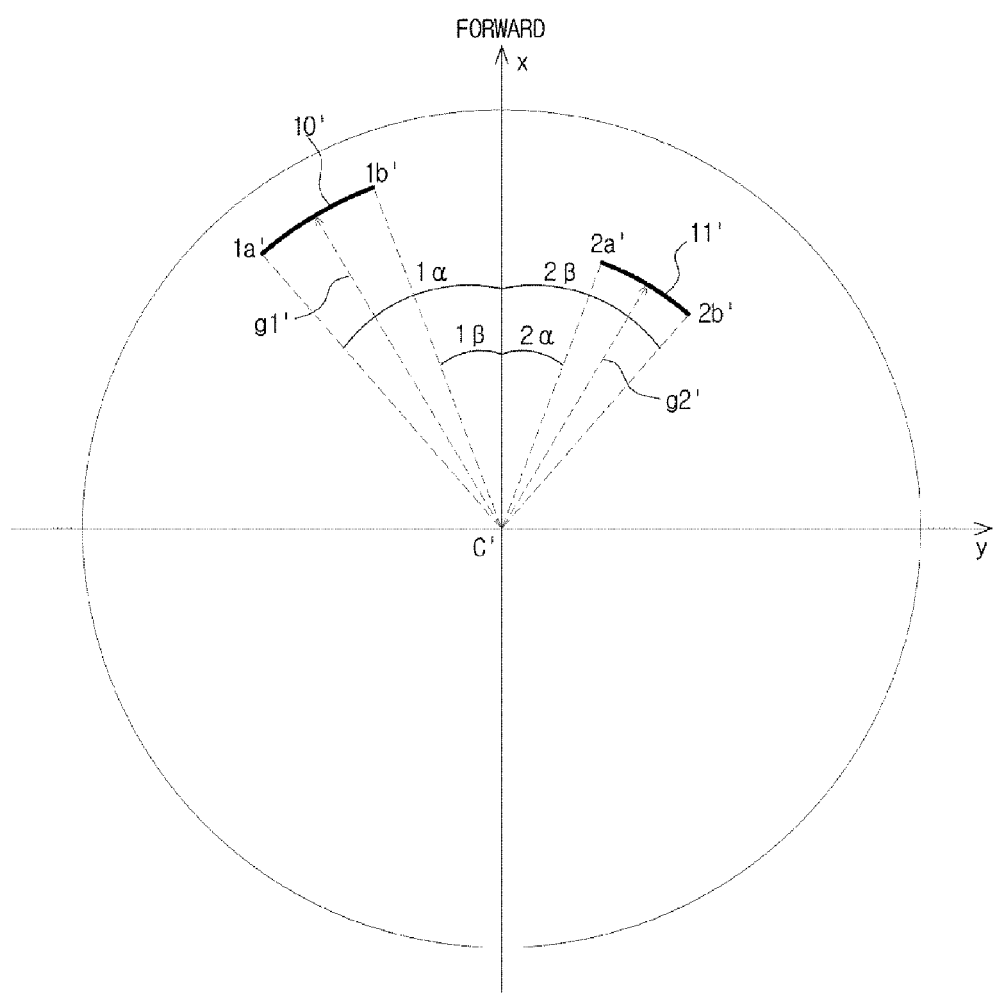
FIG. 23C is a view illustrating an image signal obtained by the image sensor of the obstacle sensing module in accordance with one embodiment of the present disclosure.

Referring to FIG. 23B, it is shown that planar light emitted from the front light emitting portion 141 straightly moves forward from the front light emitting portion 141, is reflected by obstacles at different distances from the obstacle sensing module 140, and is transmitted to the light receiving module 144.

For example, hereinafter, it will be described based on that the reflecting mirror 144a is a conical shaped mirror.

As present at a distance closer to the obstacle sensing module 140, reflected light reflected by an obstacle arrives at a place closer to the vertex of the reflecting mirror 144a. Also, as the reflected light reflected by the obstacle arrives at the place closer to the vertex of the reflecting mirror 144a, the reflected light which passes through the optical lens 144c may be obtained at a place close to the center of the image sensor 144b.

That is, being closer to the obstacle sensing module 140 means the light may be obtained at a place closer to the center of the image sensor 144b.

Referring to FIG. 23C, image signals 10' and 11' of the first obstacle 10 and the second obstacle 11 obtained by the image sensor 144b may be checked. Reflected light which is emitted from the front light emitting portion 141, reflected by an obstacle, and returns may pass through the reflecting mirror 144a and the optical lens 144c and may be obtained by the image sensor 144b as an image signal.

The image signal 10' of the first obstacle 10 is within a range of angle from 1β to 1α on the left of the x-axis and is located at a distance of g1 from the center C. That is, the image signal 10' of the first obstacle 10 may be obtained at the image sensor 144b as a shape similar to an arc determined by two radii C'1a and C'1b drawn in a circle which has a center C' and a radius g1 and two points 1a and 1b.

The image signal 11' of the second obstacle 11 is within a range of angle from 2β to 2αo the right of the x-axis and is located at a distance of g2 from the center C. That is, the image signal 11' of the second obstacle 11 may be obtained at the image sensor 144b as a shape similar to an arc determined by two radii C'2a and C'2b drawn in a circle which has a center C' and a radius g2 and two points 2a and 2b.

An electrical image signal converted by the image sensor 144b may be converted into a digital image signal by the signal processing circuit and then transmitted to the control portion 110.

The control portion 110 may analyze an image converted into the digital image signal and may determine distances between the obstacle sensing module 140 and the obstacles 10 and 11 and positions of the obstacles 10 and 11 based on the equation described above.

Figure 24:
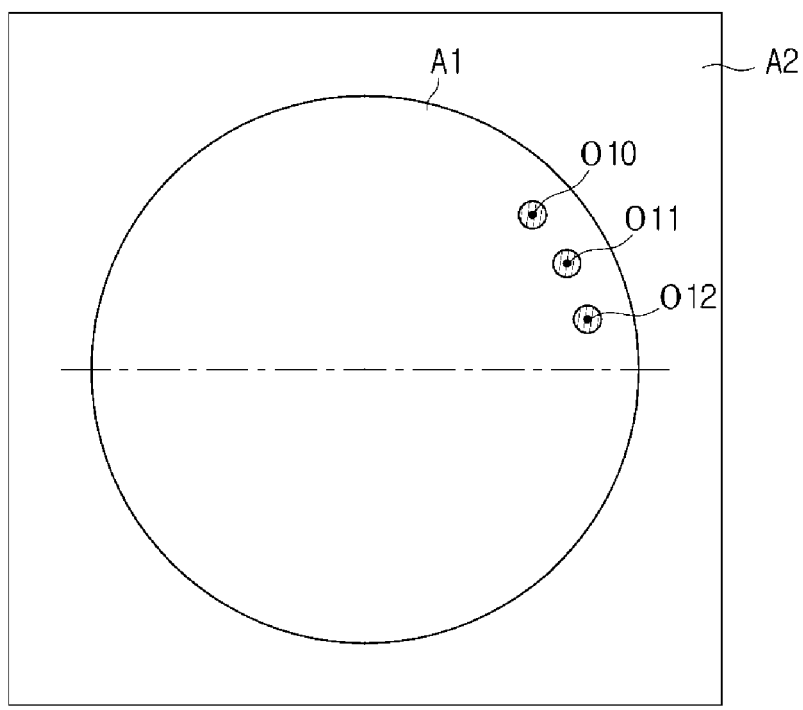
FIG. 24 illustrates an image signal obtained by the image sensor to calculate a distance to a side obstacle from light emitted from the side light emitting portion in accordance with one embodiment of the present disclosure.
Figure 25A:
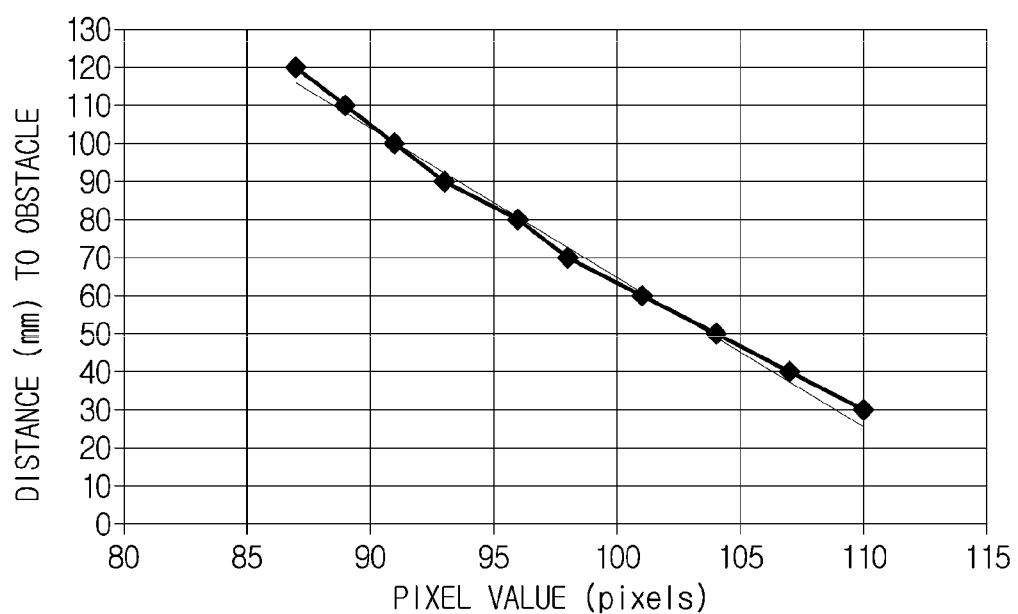

FIG. 24 illustrates an image signal obtained by the image sensor to calculate a distance to a sideward obstacle from light emitted from the side light emitting portion in accordance with one embodiment of the present disclosure. FIG. 25A and FIG. 25B are a graph and a table according to the equation for calculating a distance to a side obstacle in accordance with one embodiment of the present disclosure, respectively.

As shown in FIG. 24, light emitted from the side light emitting portion 142 may be reflected by obstacles located sideward from the cleaning robot 100 and obtained by the image sensor 144b of the light receiving module 144 as image signals O10, O11, and O12.

The side light emitting portion 142 may be embodied using a light source and a wide-angle lens like the front light emitting portion 141. In a method of measuring a distance to an obstacle which will be described below, it will be described as an example that the side light emitting portion 142 is embodied using a condensing lens and emits linear light.

The image sensor 144b may employ a CMOS image sensor, a CCD image sensor, etc. which obtains an image formed by reflected light reflected by an obstacle and simultaneously may include a photo diode sensor which detects a pixel value of the reflected light reflected by the obstacle. Also, the photo diode sensor may provide a pixel value of received light to the control portion 110 as feedback.

Information on a distance (mm) from the side light emitting portion 142 of the cleaning robot 100 to an obstacle may be stored corresponding to a pixel value in the storage portion 180 of the cleaning robot 100. FIGS. 25A and 25B illustrate the information on the distance from the side light emitting portion 142 to the obstacle and the pixel value. FIG. 25 illustrates a table in which the distance to the obstacle is mentioned from 30 mm to 120 mm at intervals of 10 mm, which is merely an example and may be linearly shown as the graph of FIG. 25A. A relationship between the distance (mm) to the obstacle and the pixel value of the received light is in Equation 3.

$$y = -3.8658 * x + 452.3 \qquad \text{Equation (3)}$$

Here, an x value is a pixel value of received light and a y value is a distance (mm) to an obstacle.

That is, when light emitted from the side light emitting portion 142 and reflected by a sideward obstacle is received at a photo diode of the image sensor 144b, the control portion 110 may determine a pixel value of a center of the light received by the photo diode and may compare the pixel value with data stored in the storage portion 180. As shown in FIG. 24, an image signal obtained by the image sensor 144b may be displayed closer to the center of the image sensor 144b as an obstacle is closer and may be displayed farther from the center of the image sensor 144b as the obstacle is farther. According to the table of FIG. 25B, a pixel value corresponding to an image signal O12 of an obstacle spaced apart at about 30 mm from the side of the cleaning robot 100 is 110 pixels and a pixel value corresponding to an image signal O10 of an obstacle spaced apart at about 70 mm is 98 pixels.

Accordingly, the control portion 110 may determine that a side obstacle is spaced apart by about 70 mm when a pixel value of an image signal obtained by the photo diode of the image sensor 144b is 98 and a sideward obstacle is spaced apart by about 30 mm when a pixel value is 110 pixels. Determining of a precise distance to a sideward obstacle may be computed using Equation 3 described above and may be calculated from the stored data.

FIG. 26 is a flowchart illustrating a method of controlling a cleaning robot which emits light to an obstacle and generates obstacle sensing information to control a driving portion in accordance with one embodiment of the present disclosure.

Referring to FIG. 26, the control portion 110 may control the front light emitting portion 141 included in the obstacle sensing module 140 to emit light forward from the cleaning robot 100 (S100). The plurality of front light emitting portions 141 may be included in the cleaning robot 100 and may each emit light to sense obstacles located forward from the cleaning robot 100 in the moving direction.

The light emitted from the front light emitting portion 141 and reflected by an obstacle located forward may be reflected by the reflecting mirror 144a included in the light receiving module 144, thereby obtaining an image signal in the first area A1 of the image sensor 144b (S105).

The control portion 110 may determine whether 20 ms of time has passed after the image signal of the forward obstacle based on the light emitted from the front light emitting portion 141 is obtained (S110) and may control the sideward light emitting portion 142 and the upper light emitting portion 143 to emit light sideward and upward from the cleaning robot 100 when the time 20 ms has passed (S115 and S120). As described above, since disposing a time interval of 20 ms from emitting light of the front light emitting portion 141 is to prevent image signals of forward obstacles and image signals of sideward obstacles obtained in the first area A1 of the image sensor 144b from overlapping one another, unlike the shown in FIG. 26, a point in time of emitting light of the upper light emitting portion 143 may be identical to a point in time of emitting light of the front light emitting portion 141.

The light emitted from the side light emitting portion 142 and reflected by an obstacle located sideward may be reflected by the reflecting mirror 144a of the light receiving module 144, thereby displaying an image signal in the first area A1 of the image sensor 144b (S125). Also, the light emitted from the upper light emitting portion 143 and reflected by an obstacle located above may not be reflected by the reflecting mirror 144a but may be displayed as an image signal in the second area A2 of the image sensor 144b (S130).

The signal processing circuit of the light receiving module 144 convert the image signals of the forward obstacle, the sideward obstacle, and the upper obstacle obtained by the image sensor 144b into electrical image signals in a digital form to transmit them to the control portion 110 (S135).

The control portion 110 may generate obstacle sensing information on the obstacles located forward, sideward, and above based on the electrical image signals in the digital form with respect to the obstacles received from the signal processing circuit (S140). The obstacle sensing information may include distances between the cleaning robot 100 and the obstacles, positions of the obstacles, heights of the obstacles, shapes of the obstacles, etc.

The control portion 110 may calculate the distances between the cleaning robot 100 and the obstacles with respect to the forward obstacle and the sideward obstacle, may generate obstacle sensing information of the upper obstacle, and may control the driving portion 160 of the cleaning robot 100 based thereon (S145). Accordingly, the cleaning robot 100 may move to clean while avoiding forward, sideward, and upper obstacle sensed by the obstacle sensing module 140 without collision.

As described above, with reference to the drawings, the cleaning robot and the method of controlling the same in accordance with one embodiment of the present disclosure have been described. Examples of the cleaning robot and the method of controlling the same are not limited thereto, and the embodiments described above are merely examples.

As apparent from the above description, a cleaning robot in accordance with one embodiment of the present disclosure senses obstacles using a plurality of infrared ray light emitting portions which face forward, sideward, and upward and one light receiving portion, thereby reducing manufacturing cost thereof and minimizing a blind spot of obstacles located above.

Although a few embodiments of the present disclosure have been shown and described, it would be appreciated by those skilled in the art that changes may be made in these embodiments without departing from the principles and spirit of the present disclosure, the scope of which is defined in the claims and their equivalents.

What is claimed is:

1. A cleaning robot comprising:
a body;
a driving portion configured to move the body;
at least one front light emitting portion configured to emit light forward from the cleaning robot;
at least one side light emitting portion configured to emit light sideward from the cleaning robot;
at least one upper light emitting portion configured to emit light upward from the cleaning robot;
one light receiving module configured to obtain an image signal of an obstacle by receiving the light emitted from at least one of the front light emitting portion, the side light emitting portion, and the upper light emitting portion that is reflected by the obstacle; and
a control portion configured to generate obstacle sensing information based on the image signal obtained by the light receiving module and control the driving portion based on the generated obstacle sensing information,
wherein an area of the light receiving module for obtaining the image signal based on the light emitted from the upper light emitting portion is different from an area of the light receiving module for obtaining the image signal based on the light emitted from the front light emitting portion and the side light emitting portion,
wherein the obstacle sensing information comprises at least one of a distance between the body and the obstacle, a position of the obstacle, a height of the obstacle, or a shape of the obstacle, and
wherein the at least one front light emitting portion, the at least one side light emitting portion, and the at least one upper light emitting portion are installed at different positions in the cleaning robot or at different heights from a ground surface.

2. The cleaning robot of claim 1, wherein the light receiving module comprises:
a reflecting mirror that reflects the light reflected by the obstacle;
an optical lens spaced apart by a predetermined distance from the reflecting mirror to allow the light reflected by the reflecting mirror to pass therethrough;
an image sensor configured to obtain an image signal based on the light which passes through the optical lens; and
a signal processing circuit configured to convert the obtained image signal into an electric image signal in a digital form.

3. The cleaning robot of claim 2, wherein the reflecting mirror, to allow the light emitted from the at least one front light emitting portion and the at least one side light emitting portion and reflected by the obstacle to pass through the optical lens, reflects the light reflected by the obstacle.

4. The cleaning robot of claim 3, wherein the image sensor is configured to obtain an image signal in a first area of the image sensor corresponding to an area of the reflecting mirror from the light emitted from the at least one front light emitting portion and the at least one side light emitting portion and reflected by the obstacle and obtain an image signal in a second area beside the first area of the image sensor from the light emitted from the at least one upper light emitting portion and reflected by the obstacle.

5. The cleaning robot of claim 4, wherein the control portion is configured to generate the obstacle sensing information of the obstacle located at least one of forward and sideward from the body based on the image signal obtained in the first area, and generate the obstacle sensing information of another obstacle located above the body based on the image signal obtained in the second area.

6. The cleaning robot of claim 5, wherein the control portion is configured control the at least one front light emitting portion and the at least one side light emitting portion to emit the light with a time difference.

7. The cleaning robot of claim 6, wherein the control portion is configured to generate the obstacle sensing information of the obstacle located forward and sideward from the body based on the image signal obtained in the first area of the image sensor from the light emitted with a time difference and reflected by the obstacle.

8. The cleaning robot of claim 7, wherein the control portion, based on the obstacle sensing information of each of the obstacle located forward and sideward from the body, is configured to calculate a distance between each of a front and sides of the body and the obstacle.

9. The cleaning robot of claim 8, wherein the control portion is configured to determine a driving type of the cleaning robot and control the driving portion based on the calculated distances and the generated obstacle sensing information.

10. The cleaning robot of claim 1, wherein:
the at least one side light emitting portion is spaced a predetermined distance from the at least one front light emitting portion, and
the at least one upper light emitting portion is installed at a predetermined angle relative to ground surface.

11. The cleaning robot of claim 10, wherein the at least one upper light emitting portion at least comprises:
at least one first upper light emitting portion; and
at least one second upper light emitting portion spaced apart by a predetermined angle from the first upper light emitting portion.

12. A method of controlling a cleaning robot, the method comprising:
emitting, by a front light emitting portion, light forward from the cleaning robot, the cleaning robot comprising a body and a driving portion that moves the body;
emitting, by a side light emitting portion, light sideward from the cleaning robot;
emitting, by an upper light emitting portion, light upward from the cleaning robot;
obtaining, by one light receiving module, an image signal of an obstacle by receiving the light emitted from at least one of the front light emitting portion, the side light emitting portion, and the upper light emitting portion that is reflected by the obstacle;
generating obstacle sensing information based on the image signal obtained by the one light receiving module; and
controlling the driving portion based on the generated obstacle sensing information,
wherein the obstacle sensing information comprises at least one of a distance between the body and the obstacle, a position of the obstacle, a height of the obstacle, or a shape of the obstacle,
wherein the light emitted forward and sideward from the body that is reflected by the obstacle is reflected by a reflecting minor and passes through an optical lens, and
wherein the light emitted upward from the body that is reflected by the obstacle passes through the optical lens without being reflected by the reflecting mirror.

13. The method of claim 12, wherein in obtaining the image signal of the obstacle by the one light receiving module, an area of the light receiving module for obtaining the image signal based on the light emitted from the upper light emitting portion is different from an area of the light receiving module for obtaining the image signal based on the light emitted from the front light emitting portion and the side light emitting portion.

14. The method of claim 12, wherein obtaining, by the one light receiving module, the image signal of the obstacle by receiving the light reflected by the obstacle comprises:
obtaining the image signal in a first area of an image sensor, corresponding to an area of the reflecting mirror, from the light emitted forward and sideward from the body and reflected by the obstacle; and
obtaining the image signal in a second area beside the first area of the image sensor from the light emitted upward from the body and the reflected by the obstacle.

15. A cleaning robot comprising:
a body;
a driving portion configured to move the body;
at least one front light emitting portion configured to emit light forward from the cleaning robot;
at least one upper light emitting portion configured to emit light upward from the cleaning robot;
one light receiving module configured to obtain an image signal of an obstacle by receiving the light emitted from at least one of the front light emitting portion and the upper light emitting portion that is reflected by the obstacle; and
a control portion configured to generate obstacle sensing information based on the image signal obtained by the light receiving module and control the driving portion based on the generated obstacle sensing information,
wherein an area of the light receiving module for obtaining the image signal based on the light emitted from the upper light emitting portion is different from an area of the light receiving module for obtaining the image signal based on the light emitted from the front light emitting portion,
wherein the obstacle sensing information comprises at least one of a distance between the body and the obstacle, a position of the obstacle, a height of the obstacle, or a shape of the obstacle, and
wherein the at least one front light emitting portion, and the at least one upper light emitting portion are installed at different positions in the cleaning robot or at different heights from a ground surface.

16. The cleaning robot of claim 15, further comprising:
at least one side light emitting portion configured to emit light sideward from the cleaning robot; and
a control portion configured to control the at least one front light emitting portion and the at least one side light emitting portion to emit light with a time difference.

* * * * *